(12) United States Patent
Takenaka et al.

(10) Patent No.: US 9,721,555 B2
(45) Date of Patent: Aug. 1, 2017

(54) VIBRATION DAMPING MATERIAL

(71) Applicants: KAO CORPORATION, Tokyo (JP); PANASONIC CORPORATION, Kadoma-shi, Osaka (JP)

(72) Inventors: Akira Takenaka, Iwade (JP); Tomoya Tsuboi, Sakai (JP); Masahiro Mori, Wakayama (JP); Yoshiro Oda, Wakayama (JP); Takashi Nagashima, Kyoto-fu (JP); Suguru Nakao, Hyogo-ken (JP)

(73) Assignees: KAO CORPORATION, Tokyo (JP); PANASONIC CORPORATION, Kadoma-Shi, Osaka (JP)

( * ) Notice: Subject to any disclaimer, the term of this patent is extended or adjusted under 35 U.S.C. 154(b) by 0 days.

(21) Appl. No.: 15/104,009

(22) PCT Filed: Dec. 16, 2014

(86) PCT No.: PCT/JP2014/083261
§ 371 (c)(1),
(2) Date: Jun. 13, 2016

(87) PCT Pub. No.: WO2015/098621
PCT Pub. Date: Jul. 2, 2015

(65) Prior Publication Data
US 2016/0314776 A1 Oct. 27, 2016

(30) Foreign Application Priority Data

Dec. 26, 2013 (JP) .................. 2013-270212
Sep. 1, 2014 (JP) .................. 2014-177426

(51) Int. Cl.
*G10K 11/165* (2006.01)
*C08K 13/02* (2006.01)
(Continued)

(52) U.S. Cl.
CPC ............ *G10K 11/165* (2013.01); *C08K 13/02* (2013.01); *C08K 13/04* (2013.01); *C08L 67/04* (2013.01);
(Continued)

(58) Field of Classification Search
CPC . H01R 1/02; C08K 3/00; C08K 13/02; C08K 13/04; C08L 67/04; C08L 101/16;
(Continued)

(56) References Cited

U.S. PATENT DOCUMENTS

| | | | |
|---|---|---|---|
| 2006/0124383 | A1 | 6/2006 | Yamada et al. |
| 2008/0071015 | A1 | 3/2008 | Kiuchi et al. |
| 2009/0069463 | A1 | 3/2009 | Serizawa et al. |

FOREIGN PATENT DOCUMENTS

| | | |
|---|---|---|
| JP | 2004-186915 A | 7/2004 |
| JP | 2007-191630 A | 8/2007 |

(Continued)

OTHER PUBLICATIONS

JP2009-286813A—machine translation—provided by Applicant.*
International Search Report (form PCT/ISA/210), dated Mar. 31, 2015, for International Application No. PCT/JP2014/083261.

*Primary Examiner* — Ling Choi
*Assistant Examiner* — Ronald Grinsted
(74) *Attorney, Agent, or Firm* — Birch, Stewart, Kolasch & Birch, LLP

(57) ABSTRACT

A material for audio equipment housing containing a polylactic acid resin composition containing a polylactic acid resin, a plasticizer, an organic crystal nucleating agent, and an inorganic material, wherein the content of the plasticizer is from 1 to 50 parts by mass based on 100 parts by mass of the polylactic acid resin; and a vibration-damping material containing a polylactic acid resin composition containing a polylactic acid resin, a plasticizer, an organic crystal nucleating agent, and an inorganic material, wherein the content (Continued)

of the plasticizer is from 1 to 50 parts by mass based on 100 parts by mass of the polylactic acid resin. The material of the present invention can be suitably used as materials for audio equipment of, for example, speakers, television, radio cassette players, headphones, audio components, or microphones, and manufactured articles, such as electric appliances, transportation vehicles, construction buildings, and industrial equipment, or parts or housing thereof.

16 Claims, 1 Drawing Sheet

(51) Int. Cl.
*C08K 13/04* (2006.01)
*C08L 67/04* (2006.01)
*H04R 1/28* (2006.01)
*C08L 101/16* (2006.01)

(52) U.S. Cl.
CPC .......... *H04R 1/2876* (2013.01); *C08L 101/16* (2013.01); *H04R 2201/029* (2013.01)

(58) Field of Classification Search
CPC ............ H04R 1/2876; H04R 2201/029; G10K 11/165
USPC ........................................................ 524/140
See application file for complete search history.

(56) References Cited

FOREIGN PATENT DOCUMENTS

| | | | |
|---|---|---|---|
| JP | 2009-286813 | A | 12/2009 |
| JP | 2009286813 | A * | 12/2009 |
| JP | 2010-70722 | A | 4/2010 |
| JP | 2010-126580 | A | 6/2010 |
| WO | WO 2005/061626 | A1 | 7/2005 |
| WO | WO 2007/094477 | A1 | 8/2007 |

* cited by examiner

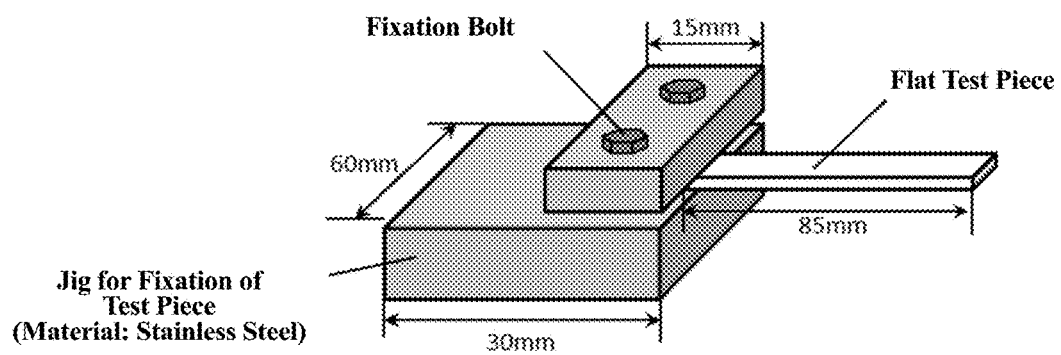

VIBRATION DAMPING MATERIAL

FIELD OF THE INVENTION

The present invention relates to a vibration-damping material. More specifically, the present invention relates to a vibration-dumping material used in audio equipment, electric appliances, transportation vehicles, construction buildings, and industrial equipment, and use of the material in the above-mentioned manufactured articles.

BACKGROUND OF THE INVENTION

Polylactic acid resins have some features that polylactic acid resins are inexpensive because L-lactic acid used as a raw material is produced from sugars extracted from maize, potato or the like according to a fermentation method, that an amount of carbon dioxide discharged is very small because the raw materials are derived from plants, and that the resins have such properties as being strongly rigid and highly transparent, so that the utilization of the polylactic acid resins is expected at present.

Patent Publication 1 discloses a material for audio equipment housing, characterized in that the material contains a biodegradable polymer compound, an inorganic material, and a hydrolysis inhibitor, as an objective for providing a material with inhibition of corrosion of resins, smaller environmental loads, and excellent performance as an audio equipment housing.

Patent Publication 1: Japanese Patent Laid-Open No. 2004-186915

SUMMARY OF THE INVENTION

The present invention relates to the following [1] to [6]:

[1] A material for an audio equipment housing containing a polylactic acid composition containing a polylactic acid, a plasticizer, an organic crystal nucleating agent, and an inorganic material, wherein the content of the above plasticizer is from 1 to 50 parts by mass based on 100 parts by mass of the polylactic acid resin.

[2] An audio equipment housing containing a material as defined in the above [1].

[3] Use of a polylactic acid resin composition defined in the above [1] as a material for an audio equipment housing.

[4] A vibration-damping material containing a polylactic acid resin composition containing a polylactic acid resin, a plasticizer, an organic crystal nucleating agent, and an inorganic material, wherein the content of the above plasticizer is from 1 to 50 parts by mass based on 100 parts by mass of the polylactic acid resin.

[5] A manufactured article selected from the group consisting of audio equipment, electric appliances, transportation vehicles, construction buildings, and industrial equipment, or parts or housing thereof, containing a vibration-damping material as defined in the above [4].

[6] Use of a polylactic acid resin composition defined in the above [4] as a vibration-damping material.

BRIEF DESCRIPTION OF THE DRAWINGS

FIG. 1 is a view showing a jig used in the measurement of vibration time.

DETAILED DESCRIPTION OF THE INVENTION

In the material of Patent Publication 1, the vibration time is long, so that satisfactory sound quality cannot be obtained.

In addition, other vibration-damping materials include materials bonding together a metal plate and a vibration-absorbing material such as rubber or asphalt, or a composite material such as a vibration-damping steel plate in which a vibration absorbing material is interposed between the metal plates. These vibration-damping materials retain the shape with a highly rigid metal plate, and absorb vibrations with a vibration absorbing material. In addition, in cases of metals alone, the vibration-damping material includes an alloy material that converts kinetic energy to thermal energy utilizing twinning or ferromagnetization to absorb vibrations. However, there are some disadvantages in the composite material that different materials are put together, thereby posing some limitations in the molding workability, and use of a metal steel plate makes the manufactured article itself heavier. Also, the alloy material is heavy because only metals are used, and further is insufficient in the vibration-damping property.

The present invention relates to a vibration-damping material that is hardly likely to vibrate even while having a high flexural modulus.

The vibration-damping material of the present invention has a short vibration time even while having a high flexural modulus, so that the vibration-damping material exhibits some excellent effects that the generated vibrations are controlled when the vibration-damping material is used in housing or parts of surroundings of the generated source for vibrations or sound, or the material is placed between the generated source, in the manufactured article equipment or apparatus, or structure that generates vibrations or sounds, which consequently reduce too many vibrations relating to manufactured articles and apparatus performances, or unpleasant vibrations and sound, or noises. For example, in a case where the vibration-damping material is used in an audio equipment housing, some excellent effects are exhibited that sound quality that is in pesante at low noises can be obtained.

<Vibration-Damping Material>

The material of the present invention relates to a vibration-damping material applicable in various fields, including materials for audio equipment housings. Therefore, the term "vibration-damping material" as used herein means a material containing "a material for audio equipment housings." Moreover, the vibration-damping material of the present invention contains a polylactic acid resin composition containing a polylactic acid resin, a specified amount of a plasticizer, an organic crystal nucleating agent, and an inorganic material. The polylactic acid resin composition as used herein may be described as the polylactic acid resin composition of the present invention.

In general, as vibration-damping materials, materials having viscoelasticity are used, and vibration time is shortened by absorbing energy applied from an external environment. Specifically, representative examples thereof include rubber and elastomer materials, and since the rigidity, in other words, flexural modulus, of the materials themselves is low, there are some disadvantages such that an initial vibration width of vibrations becomes large when the same stress is applied, thereby making the vibration-damping property poorer, and that in a case where the materials are used in structural members such as equipment housings, when stress is applied, deformation takes place, so that the shape cannot be maintained. On the other hand, a method of including an elastomer or a plasticizer, in order to improve the vibration-damping property of a rigid resin having a high flexural modulus used in structural members may also be considered. However, when a plasticizer is contained in a resin used in audio equipment housings, for example, ABS resin, the vibration time is not shorted as much as needed even while the flexural modulus is lowered. On the other hand, in a polylactic acid resin composition, it is assumed that if a plasticizer is added, the compatibility between the resin and the plasticizer is high, so that the lowering of the flexural modulus is suppressed to a certain extent, and at the same time the viscosity of the resin composition is improved, so that vibration energy is converted to thermal energy in the internal of the resin upon applying vibrations, thereby shortening the vibration time. The shortening of the vibration time has some effects of reducing sounds and noise. Especially, it is assumed that when the polylactic acid resin contains a specified plasticizer, the compatibility becomes remarkably high, so that the vibration time is also remarkably shortened.

[Polylactic Acid Resin Composition]
(Polylactic Acid Resin)

The polylactic acid resin in the present invention refers to a polylactic acid, or a copolymer of a lactic acid and a hydroxycarboxylic acid. The hydroxycarboxylic acid includes glycolic acid, hydroxybutyric acid, hydroxyvaleric acid, hydroxypentanoic acid, hydroxycaproic acid, hydroxyheptanoic acid, and the like, and glycolic acid and hydroxycaproic acid are preferred.

Preferred molecular structures of the polylactic acid are those composed of from 80 to 100% by mol of either unit of L-lactic acid (L-form) or D-lactic acid (D-form), and from 0 to 20% by mol of a lactic acid unit in an enantiomer thereof. In addition, the copolymer of a lactic acid and a hydroxycarboxylic acid is composed of from 85 to 100% by mol of either unit of L-lactic acid or D-lactic acid, and from 0 to 15% by mol of a hydroxycarboxylic acid unit.

These polylactic acid resins can be obtained by selecting one having a structure that is needed from L-lactic acid, D-lactic acid, and a hydroxycarboxylic acid as raw materials, and subjecting the components to dehydration polycondensation. Preferably, the polylactic acid resin can be obtained by selecting one having a structure that is needed from a lactide, which is a cyclic lactic acid dimer, a glycolide, which is a cyclic glycolic acid dimer, a caprolactone, or the like, and subjecting the components to a ring-opening polymerization. The lactides are in the form of L-lactide, which is a cyclic L-lactic acid dimer; D-lactide, which is a cyclic D-lactic acid dimer; meso-lactide, which is a cyclic dimer of D-lactic acid and L-lactic acid; and DL-lactide, which is a racemic mixture of the D-lactide and the L-lactide. In the present invention, any one of the lactides can be used, and the D-lactide or the L-lactide is preferred as the main raw material.

In the present invention, it is preferable to use a polylactic acid resin having a high optical purity of the lactic acid component as the vibration-damping material, from the viewpoint of shortening the vibration time. Specifically, L-form or D-form is contained in an amount of preferably 80% by mol or more, L-form or D-form is contained in an amount of more preferably 90% by mol or more, L-form or D-form is contained in an amount of even more preferably 95% by mol or more, L-form or D-form is contained in an amount of even more preferably 98% by mol or more, and L-form or D-form is contained in an amount of even more preferably 99% by mol or more, of the entire lactic acid component of the polylactic acid resin.

In addition, in the present invention, as the vibration-damping material, a stereocomplex polylactic acid resin may be used, from the viewpoint of improving flexural modulus.

The stereocomplex polylactic acid resin is a polylactic acid resin composed of two kinds of polylactic acids, each obtained from a lactic acid component containing an isomer different from one another as a main component. One polylactic acid constituting the stereocomplex polylactic acid resin [hereinafter referred to as "polylactic acid (A)"] contains L-form in an amount of from 90 to 100% by mol, and other component including D-form in an amount of from 0 to 10% by mol. The other polylactic acid [hereinafter referred to as "polylactic acid (B)"] contains D-form in an amount of from 90 to 100% by mol, and other component including L-form in an amount of from 0 to 10% by mol. Here, other components besides L-form and the D-form mentioned above include dicarboxylic acids, polyhydric alcohols, hydroxycarboxylic acids, lactone, and the like, each having a functional group capable of forming two or more ester bonds. Also, other components may be a polyester, a polyether, a polycarbonate, or the like, each having two or more unreacted functional groups mentioned above in one molecule.

A mass ratio of the polylactic acid (A) to the polylactic acid (B) in the stereocomplex polylactic acid resin, i.e. polylactic acid (A)/polylactic acid (B), is preferably from 10/90 to 90/10, more preferably from 20/80 to 80/20, and even more preferably from 40/60 to 60/40.

The weight-average molecular weight of the polylactic acid resin is preferably 100,000 or more, and more preferably 150,000 or more, from the viewpoint of improving flexural modulus as the vibration-damping material, and the weight-average molecular weight is preferably 400,000 or less, and more preferably 350,000 or less, from the viewpoint of shortening the vibration time as the vibration-damping material. Here, the weight-average molecular weight of the polylactic acid resin can be obtained by using gel permeation chromatography (GPC), with chloroform as a solvent, a high-temperature SEC column (GMHHR-H Series) manufactured by Tosoh Corporation as a column, a flow rate of 1.0 mL/min, a column temperature of 40° C., and a differential refractive index detector (RI) as a detector, and calculating using polystyrenes of known molecular weights as a reference.

Here, the polylactic acid resin can be synthesized in accordance with a known method, or commercially available manufactured products can be used. Commercially available products include, for example, ones manufactured by TOYOTA MOTOR CORPORATION under the trade names of Ecoplastic U'z, ones manufactured by Nature Works under the trade names of Nature Works, one manufactured by Zhejiang Hisun Biomaterials Co., Ltd. under the trade name of REVODE, and the like. In addition, among the above-mentioned commercially available products, ones manufactured by TOYOTA MOTOR CORPORATION under the trade names of Ecoplastic U'z S-9, S-12, and S-17, and ones manufactured by Nature Works under the trade names of Nature Works 4032D and 3001D are preferred, from the viewpoint of improving moldability.

The content of the polylactic acid resin is preferably 30% by mass or more, more preferably 40% by mass or more, and even more preferably 45% by mass or more, of the polylactic acid resin composition, from the viewpoint of accomplishing the objective of the present invention, and the content is preferably 90% by mass or less, more preferably 85% by mass or less, and even more preferably 80% by mass or less, from the viewpoint of blending the other components.

(Plasticizer)

The polylactic acid resin composition of the present invention contains a plasticizer as a vibration-damping material, from the viewpoint of shortening the vibration time.

It is preferable that the plasticizer includes one or more members selected from the group consisting of polyester-based plasticizers, polyhydric alcohol ester-based plasticizers, polycarboxylic acid ester-based plasticizers, and phosphoric ester-based plasticizers.

Specific examples of the polyester-based plasticizers include polyesters obtained from dicarboxylic acids having preferably from 2 to 12 carbon atoms, and more preferably from 2 to 6 carbon atoms, and di-alcohol having preferably from 2 to 12 carbon atoms, and more preferably from 2 to 6 carbon atoms, or a (poly)oxyalkylene adduct thereof, and the like. The dicarboxylic acids include succinic acid, adipic acid, sebacic acid, terephthalic acid, isophthalic acid, and the like. The di-alcohols include propylene glycol, 1,3-butanediol, 1,4-butanediol, 1,6-hexanediol, ethylene glycol, diethylene glycol, triethylene glycol, and the like. In addition, a hydroxyl group or a carboxy group of a polyester terminal may be esterified with a monocarboxylic acid or a mono-alcohol to be capped.

Specific examples of the polyhydric alcohol ester-based plasticizers include mono-, di- or triesters obtained from polyhydric alcohols or (poly)oxyalkylene adducts thereof, and monocarboxylic acids having preferably from 1 to 12 carbon atoms, more preferably from 1 to 6 carbon atoms, and even more preferably from 1 to 4 carbon atoms. The polyhydric alcohols include polyethylene glycol, polypropylene glycol, glycerol, the above-mentioned di-alcohols, and the like. The monocarboxylic acids include acetic acid, propionic acid, and the like.

The polycarboxylic acid ester-based plasticizers include mono-, di- or triesters obtained from polycarboxylic acids, and mono-alcohols having preferably from 1 to 12 carbon atoms, more preferably from 1 to 6 carbon atoms, and even more preferably from 1 to 4 carbon atoms, or (poly)oxyalkylene adducts thereof. The polycarboxylic acids include trimellitic acid, the above-mentioned dicarboxylic acids, and the like. The mono-alcohols include methanol, ethanol, 1-propanol, and 1-butanol, and the like. Specific examples include phthalate esters such as dimethyl phthalate, diethyl phthalate, dibutyl phthalate, dioctyl phthalate, diheptyl phthalate, dibenzyl phthalate, and butylbenzyl phthalate; trimellitate esters such as tributyl trimellitate, trioctyl trimellitate, and trihexyl trimellitate; adipate esters such as diisodecyl adipate and octyldecyl adipate; citrate esters such as triethyl acetyl citrate and tributyl acetyl citrate; azelaate esters such as di-2-ethylhexyl azelaate; sebacate esters such as dibutyl sebacate and di-2-ethylhexyl sebacate; esters obtained from succinic acid and a polyethylene glycol monomethyl ether of which ethylene oxide has an average number of moles added of from 2 to 3 (ethylene oxide being added in an amount of from 2 to 3 mol per one hydroxyl group), and the like.

The phosphoric ester-based plasticizers include mono-, di-, or triesters obtained from phosphoric acid and the above-mentioned mono-alcohol or a (poly)oxyalkylene adduct thereof. Specific examples include tributyl phosphate, tri-2-ethylhexyl phosphate, trioctyl phosphate, triphenyl phosphate, diphenyl-2-ethylhexyl phosphate, tricresyl phosphate, tris(ethoxyethoxyethyl) phosphate, and the like.

It is preferable that the plasticizer contains an ester compound having a (poly)oxyalkylene group or an alkylene group having from 2 to 6 carbon atoms, more preferably containing one or more members selected from the group consisting of polyester-based plasticizers, polyhydric alcohol ester-based plasticizers, polycarboxylic acid ester-based plasticizers, and phosphoric ester-based plasticizers, each having a (poly)oxyalkylene group or an alkylene group having from 2 to 6 carbon atoms, and even more preferably containing one or more members selected from the group consisting of polyester-based plasticizers, polyhydric alcohol ester-based plasticizers, polycarboxylic acid ester-based plasticizers, and phosphoric ester-based plasticizers, each having a (poly)oxyalkylene group, from the viewpoint of increasing viscosity, thereby shortening the vibration time. Here, the (poly)oxyalkylene group means an oxyalkylene group or a polyoxyalkylene group. The oxyalkylene group has an alkylene group having preferably from 2 to 6 carbon atoms, and more preferably from 2 to 4 carbon atoms, and even more preferably an oxyethylene group, an oxypropylene group, or an oxybutylene group, and still even more preferably an oxyethylene group or an oxypropylene group.

From the viewpoint of increasing viscosity, thereby shortening the vibration time, it is preferable that the plasticizer contains one or more members selected from the group consisting of the following Compound Groups (A) to (C), and when two or more kinds are used in combination, the compounds may belong to the same Compound Group, or different Compound Groups.

Compound Group (A): An Ester Compound Containing Two or More Ester groups in the molecule, wherein at least one kind of the alcohol component constituting the ester compound is an adduct of an alcohol reacted with an alkylene oxide having from 2 to 3 carbon atoms in an amount of from 0.5 to 5 mol on average, per one hydroxyl group;

Compound Group (B): A Compound Represented by the Formula (I):

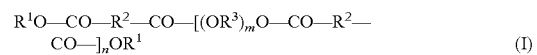

$$R^1O{-}CO{-}R^2{-}CO{-}[(OR^3)_mO{-}CO{-}R^2{-}CO{-}]_nOR^1 \quad (I)$$

wherein $R^1$ is an alkyl group having from 1 to 4 carbon atoms; $R^2$ is an alkylene group having from 2 to 4 carbon atoms; $R^3$ is an alkylene group having from 2 to 6 carbon atoms, m is the number of from 1 to 6, and n is the number of from 1 to 12, with proviso that all of $R^2$'s may be identical or different, and that all of $R^3$'s may be identical or different; and Compound Group (C): A Compound Represented by the Formula (II):

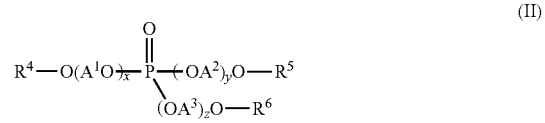

wherein each of $R^4$, $R^5$, and $R^6$ is independently an alkyl group having from 1 to 4 carbon atoms; each of $A^1$, $A^2$, and $A^3$ is independently an alkylene group having 2 or 3 carbon atoms; and each of x, y, and z is independently a positive number showing the average number of moles of an oxyalkylene group added, wherein x+y+z satisfies a number of exceeding 3 and 12 or less.

Compound Group (A)

It is preferable that the ester compound contained in Compound Group (A) is a polyhydric alcohol ester or polycarboxylic ether ester, each having two or more ester groups in the molecule, wherein at least one kind of the alcohol component constituting the ester compound is an adduct of an alcohol reacted with an alkylene oxide having from 2 to 3 carbon atoms in an amount of from 0.5 to 5 mol on average, per one hydroxyl group.

Specific compounds are preferably:
esters obtained from acetic acid and an adduct of glycerol reacted with ethylene oxide in an amount of from 3 to 6 mol on average (reacted with ethylene oxide in an amount of from 1 to 2 mol per one hydroxyl group);
esters obtained from acetic acid and an adduct of polyethylene glycol reacted with ethylene oxide in an amount of from 4 to 6 mol on average;
esters obtained from succinic acid and a polyethylene glycol monomethyl ether reacted with ethylene oxide in an amount of from 2 to 3 mol on average (reacted with ethylene oxide in an amount of from 2 to 3 mol per one hydroxyl group);
esters obtained from adipic acid and diethylene glycol monomethyl ether; and
esters obtained from 1,3,6-hexanetricarboxylic acid and diethylene glycol monomethyl ether.

Compound Group (B)

$R^1$ in the formula (I) is an alkyl group having from 1 to 4 carbon atoms, and two of them are present in one molecule, both at the terminals of the molecule. If $R^1$ has from 1 to 4 carbon atoms, it may be linear or branched. The number of carbon atoms of the alkyl group is preferably from 1 to 4, and more preferably from 1 to 2, from the viewpoint of exhibiting coloration resistance and plasticizing effects. Specific examples include a methyl group, an ethyl group, a propyl group, an isopropyl group, a butyl group, a sec-butyl group, a tert-butyl group, and an iso-butyl group, among which a methyl group and an ethyl group are preferred, and a methyl group is more preferred, from the viewpoint of shortening the vibration time as a vibration-damping material.

$R^2$ in the formula (I) is an alkylene group having from 2 to 4 carbon atoms, and includes linear alkylene groups as preferred examples. Specific examples include an ethylene group, a 1,3-propylene group, and a 1,4-butylene group. An ethylene group, a 1,3-propylene group, and a 1,4-butylene group are preferred, and an ethylene group is more preferred, from the viewpoint of shortening the vibration time as a vibration-damping material. Here, all the $R^2$'s may be identical or different.

$R^3$ in the formula (I) is an alkylene group having from 2 to 6 carbon atoms, and $OR^3$ exists in the repeating unit as an oxyalkylene group. $R^3$ may be linear or branched so long as the alkylene group has from 2 to 6 carbon atoms. The number of carbon atoms of the alkylene group is preferably from 2 to 6, and more preferably from 2 to 3, from the viewpoint of shortening the vibration time as a vibration-damping material. Specific examples include an ethylene group, a 1,2-propylene group, a 1,3-propylene group, a 1,2-butylene group, a 1,3-butylene group, a 1,4-butylene group, a 2-methyl-1,3-propylene group, a 1,2-pentylene group, a 1,4-pentylene group, a 1,5-pentylene group, a 2,2-dimethyl-1,3-propylene group, a 1,2-hexylene group, a 1,5-hexylene group, a 1,6-hexylene group, a 2,5-hexylene group, and a 3-methyl-1,5-pentylene group, among which an ethylene group, a 1,2-propylene group, and a 1,3-propylene group are preferred. Here, all the $R^3$'s may be identical or different.

m is an average number of repeats of an oxyalkylene group, and m is preferably the number of from 1 to 6, more preferably the number of from 1 to 4, and even more preferably from the number of from 1 to 3, from the viewpoint of heat resistance.

n is an average number of repeats of repeating units, i.e. an average degree of polymerization, and n is the number of from 1 to 12. n is preferably the number of from 1 to 12, more preferably the number of from 1 to 6, and even more preferably the number of from 1 to 5, from the viewpoint of shortening the vibration time as a vibration-damping material. The average degree of polymerization may be obtained by an analysis by NMR or the like, but the average degree of polymerization can be calculated in accordance with the method described in Examples set forth below.

Specific examples of the compound represented by the formula (I) are preferably compounds in which all the $R^1$'s are methyl groups, $R^2$ is an ethylene group or a 1,4-butylene group, $R^3$ is an ethylene group or a 1,3-propylene group, m is the number of from 1 to 4, and n is the number of from 1 to 6, and more preferably compounds in which all the $R^1$'s are methyl groups, $R^2$ is an ethylene group or a 1,4-butylene group, $R^3$ is an ethylene group or a 1,3-propylene group, m is the number of from 1 to 3, and n is the number of from 1 to 5.

The compound represented by the formula (I) is not particularly limited so long as the compound has the structure mentioned above, and those obtained using the following raw materials (1) to (3) are preferred. Here, (1) and (2), or (2) and (3) may form ester compounds. (2) may be an acid anhydride or an acid halide.

(1) Monohydric Alcohol Containing Alkyl Group Having from 1 to 4 Carbon Atoms (2) Dicarboxylic Acid Containing Alkylene Group Having from 2 to 4 Carbon Atoms (3) Dihydric Alcohol Containing Alkylene Group Having from 2 to 6 Carbon Atoms (1) Monohydric Alcohol Containing Alkyl Group Having from 1 to 4 Carbon Atoms The monohydric alcohol containing an alkyl group having from 1 to 4 carbon atoms is an alcohol including $R^1$ as defined above, and specific examples include methanol, ethanol, 1-propanol, 2-propanol, 1-butanol, 2-butanol, 2-methyl-1-propanol, and 1,1-dimethyl-1-ethanol. Among them, methanol, ethanol, 1-propanol, and 1-butanol are preferred, methanol and ethanol are more preferred, and methanol is even more preferred, from the viewpoint of shortening the vibration time as a vibration-damping material.

(2) Dicarboxylic Acid Containing Alkylene Group Having from 2 to 4 Carbon Atoms

The dicarboxylic acid containing an alkylene group having from 2 to 4 carbon atoms is a dicarboxylic acid including $R^2$ as defined above, and specific examples include succinic acid, glutaric acid, adipic acid, and derivatives thereof, e.g. succinic anhydride, glutaric anhydride, dimethyl succinate, dibutyl succinate, dimethyl glutarate, dimethyl adipate, and the like. Among them, succinic acid, adipic acid and derivatives thereof, e.g. succinic anhydride, dimethyl succinate, dibutyl succinate, and dimethyl adipate, are preferred, and succinic acid and derivatives thereof, e.g. succinic anhydride, dimethyl succinate, and dibutyl succinate, are more preferred, from the viewpoint of shortening the vibration time as a vibration-damping material.

(3) Dihydric Alcohol Containing Alkylene Group Having from 2 to 6 Carbon Atoms

The dihydric alcohol containing an alkylene group having from 2 to 6 carbon atoms is a dihydric alcohol including $R^3$ as defined above, and specific examples include ethylene glycol, diethylene glycol, triethylene glycol, tetraethylene glycol, 1,2-propanediol, 1,3-propanediol, 2-methyl-1,3-propanediol, 2,2-dimethyl-1,3-propanediol, 1,2-butanediol, 1,3-butanediol, 1,4-butanediol, 1,2-pentanediol, 1,4-pentanediol, 1,5-pentanediol, 2,5-hexanediol, 1,6-hexanediol, and 3-methyl-1,5-pentanediol. Among them, diethylene glycol, triethylene glycol, 1,2-propanediol, 1,3-propanediol, tetraethylene glycol, and 1,4-butanediol are preferred, diethylene glycol, triethylene glycol, 1,2-propanediol, and 1,3-propanediol are more preferred, and diethylene glycol, triethylene glycol, and 1,3-propanediol are even more preferred, from the viewpoint of shortening the vibration time as a vibration-damping material.

Accordingly, as the above (1) to (3), it is preferable that (1) the monohydric alcohol is one or more members selected from the group consisting of methanol, ethanol, 1-propanol, and 1-butanol, that (2) the dicarboxylic acid is one or more members selected from the group consisting of succinic acid, adipic acid, glutaric acid, and derivatives thereof, and that (3) the dihydric alcohol is one or more members selected from the group consisting of diethylene glycol, triethylene glycol, 1,2-propanediol, 1,3-propanediol, tetraethylene glycol, and 1,4-butanediol;

it is more preferable that (1) the monohydric alcohol is one or more members selected from the group consisting of methanol and ethanol, that (2) the dicarboxylic acid is one or more members selected from the group consisting of succinic acid, adipic acid, and derivatives thereof, and that (3) the dihydric alcohol is one or more members selected from the group consisting of diethylene glycol, triethylene glycol, 1,2-propanediol, and 1,3-propanediol; and it is even more preferable that (1) the monohydric alcohol is methanol, that (2) the dicarboxylic acid is one or more members selected from the group consisting of succinic acid and derivatives thereof, and that (3) the dihydric alcohol is one or more members selected from the group consisting of diethylene glycol, triethylene glycol, and 1,3-propanediol.

The method for obtaining an ester compound represented by the formula (I) by using the above (1) to (3) is not particularly limited, and the method includes, for example, the methods of the following Embodiment 1 and Embodiment 2:

Embodiment 1 a method including the steps of carrying out an esterification reaction between (2) the dicarboxylic acid and (1) the monohydric alcohol to synthesize a dicarboxylic acid ester; and carrying out an esterification reaction between the dicarboxylic acid ester obtained and (3) the dihydric alcohol; and Embodiment 2 a method including the step of allowing to react (1) the monohydric alcohol, (2) the dicarboxylic acid, and (3) the dihydric alcohol at one time.

Among these methods, the method of Embodiment 1 is preferred, from the viewpoint of adjusting an average degree of polymerization. Here, the reactions of each of the steps mentioned above can be carried out in accordance with a known method.

The acid value of the compound represented by the formula (I) is preferably 1.50 mgKOH/g or less, and more preferably 1.00 mgKOH/g or less, from the viewpoint of shortening the vibration time as a vibration-damping material, and the hydroxyl value is preferably 10.0 mgKOH/g or less, more preferably 5.0 mgKOH/g or less, and even more preferably 3.0 mgKOH/g or less, from the viewpoint of shortening the vibration time as a vibration-damping material. The acid value and the hydroxyl value of the plasticizer as used herein can be measured in accordance with the methods described in Examples set forth below.

In addition, the number-average molecular weight of the compound represented by the formula (I) is preferably from 300 to 1,500, and more preferably from 300 to 1,000, from the viewpoint of shortening the vibration time as a vibration-damping material, and from the viewpoint of coloration resistance. The number-average molecular weight of the plasticizer as used herein can be calculated in accordance with the method described in Examples set forth below.

The saponification value of the compound represented by the formula (I) is preferably from 500 to 800 mgKOH/g, and more preferably from 550 to 750 mgKOH/g, from the viewpoint of shortening the vibration time as a vibration-damping material. The saponification value of the plasticizer as used herein can be measured in accordance with the method described in Examples set forth below.

The alkyl esterification percentage based on the two molecular terminals (terminal alkyl esterification percentage) of the compound represented by the formula (I) is preferably 95% or more, and more preferably 98% or more, from the viewpoint of shortening the vibration time as a vibration-damping material. The terminal alkyl esterification percentage of the plasticizer as used herein can be calculated in accordance with the method described in Examples set forth below.

The ether group value of the compound represented by the formula (I) is preferably from 0 to 8 mmol/g, and more preferably from 0 to 6 mmol/g, from the viewpoint of shortening the vibration time as a vibration-damping material. The ether group value of the plasticizer as used herein can be calculated in accordance with the method described in Examples set forth below.

Compound Group (C)

The compound represented by the formula (II) is a polyether-form phosphoric triester, which may take a symmetric structure or an asymmetric structure, and the phosphoric triester having a symmetric structure is preferred, from the viewpoint of simplicity in the production.

Each of $R^4$, $R^5$, and $R^6$ is independently an alkyl group having from 1 to 4 carbon atoms, which may be linear or branched. Specific examples include a methyl group, an ethyl group, a propyl group, an isopropyl group, a butyl group, and an isobutyl group, and an ethyl group, a propyl group, or a butyl group is preferred. In addition, an alkyl group having from 2 to 3 carbon atoms, i.e. an ethyl group or a propyl group, is more preferred, from the viewpoint of shortening the vibration time as a vibration-damping material.

Each of $A^1$, $A^2$, and $A^3$ is independently an alkylene group having 2 or 3 carbon atoms, which may be linear or branched. Specific examples include an ethylene group, an n-propylene group, and an isopropylene group, among which an ethylene group is preferred, from the viewpoint of shortening the vibration time as a vibration-damping material. Also, $A^1$, $A^2$, and $A^3$ form oxyalkylene groups, i.e. alkylene oxides, with an adjoining oxygen atom to form a repeating structure in the compound represented by the formula (II).

Each of x, y, and z is independently a positive number showing the number of average moles of oxyalkylene groups added, wherein x+y+z satisfies the number that exceeds 3 and is equal to or less than 12. Among them, x, y, and z are positive numbers, wherein x+y+z satisfies preferably the number that exceeds 3 and is less than 12, more preferably the number that exceeds 4 and is less than 12, and even more preferably the number of equal to or greater than 6 and equal to or less than 9, from the viewpoint of shortening the vibration time as a vibration-damping material.

Accordingly, the compound represented by the formula (II) is
(1) preferably a compound where each of $R^4$, $R^5$, and $R^6$ is independently an alkyl group having from 1 to 4 carbon atoms; each of $A^1$, $A^2$, and $A^3$ is independently an alkylene group having 2 or 3 carbon atoms; and each of x, y, and z is independently a positive number showing the number of average moles of oxyalkylene groups added, wherein x+y+z satisfies the number that exceeds 3 and is equal to or less than 12,
(2) more preferably a compound where each of $R^4$, $R^5$, and $R^6$ is independently an alkyl group having from 1 to 4 carbon atoms; all of $A^1$'s, $A^2$'s, and $A^3$'s are an ethylene group; and x, y, and z are positive numbers, wherein x+y+z satisfies the number that exceeds 4 and is less than 12, and
(3) even more preferably a compound where each of $R^4$, $R^5$, and $R^6$ is independently an alkyl group having from 1 to 4 carbon atoms; all of $A^1$'s, $A^2$'s, and $A^3$'s are an ethylene group; and x, y, and z are positive numbers, wherein x+y+z satisfies the number that is equal to or greater than 6 and equal to or less than 9.

Specific examples of the compound represented by the formula (II) include symmetric polyether-form phosphoric triesters such as tris(ethoxyethoxyethyl) phosphate, wherein in the formula (II) all of $R^4$'s, $R^5$'s, and $R^6$'s are ethyl groups, all of $A^1$'s, $A^2$'s, and $A^3$'s are ethylene groups, all of x, y, and z are 2, and x+y+z=6, tris(methoxyethoxyethyl) phosphate, x+y+z=6, tris(propoxyethoxyethyl) phosphate, x+y+z=6, tris(butoxyethoxyethyl) phosphate, x+y+z=6, tris(methoxyethoxyethoxyethyl) phosphate, x+y+z=9, tris(ethoxyethoxyethoxyethyl) phosphate, x+y+z=9, and tris(propoxyethoxyethoxyethyl) phosphate, x+y+z=9; and asymmetric polyether-form phosphoric triesters such as bis(ethoxyethoxyethyl)methoxyethoxyethyl phosphate, x+y+z=7, bis(methoxyethoxyethyl)ethoxyethoxyethyl phosphate, x+y+z=8, and bis(ethoxyethoxyethyl)-{butoxyethoxyethyl}phosphate, x+y+z=6; or an asymmetric polyether-form phosphoric ester obtained by triester-phosphorylating a mixture of a polyoxyethylene adduct or polyoxypropylene adduct of an alcohol having from 1 to 4 carbon atoms so as to satisfy the formula (II). Tris(ethoxyethoxyethyl) phosphate, tris(propoxyethoxyethyl) phosphate, tris(ethoxyethoxyethoxyethyl) phosphate, or tris(propoxyethoxyethoxyethyl) phosphate is preferred, and tris(ethoxyethoxyethyl) phosphate is more preferred, from the viewpoint of shortening the vibration time as a vibration-damping material.

The content of one or more members selected from the group consisting of polyester-based plasticizers, polyhydric alcohol ester-based plasticizers, polycarboxylic acid ester-based plasticizers, and phosphoric ester-based plasticizers, preferably the content of one or more members selected from the group consisting of polyester-based plasticizers, polyhydric alcohol ester-based plasticizers, polycarboxylic acid ester-based plasticizers, and phosphoric ester-based plasticizers, each having a (poly)oxyalkylene group or an alkylene group having from 2 to 6 carbon atoms, more preferably the content of one or more members selected from the group consisting of polyester-based plasticizers, polyhydric alcohol ester-based plasticizers, polycarboxylic acid ester-based plasticizers, and phosphoric ester-based plasticizers, each having a (poly)oxyalkylene group, and even more preferably the content of one or more compounds selected from the group consisting of Compound Groups (A) to (C) mentioned above is preferably 50% by mass or more, more preferably 80% by mass or more, even more preferably 90% by mass or more, and even more preferably substantially 100% by mass, of the plasticizer, from the viewpoint of shortening the vibration time as a vibration-damping material. The above-mentioned content of the plasticizer as used herein means a total content when plural compounds are contained.

The content of the plasticizer, based on 100 parts by mass of the polylactic acid resin, is 1 part by mass or more, preferably 5 parts by mass or more, more preferably 8 parts by mass or more, even more preferably 10 parts by mass or more, and still even more preferably 12 parts by mass or more, from the viewpoint of shortening the vibration time as a vibration-damping material, and the content is 50 parts by mass or less, preferably 40 parts by mass or less, more preferably 30 parts by mass or less, even more preferably 25 parts by mass or less, and still even more preferably 20 parts by mass or less, from the viewpoint of suppressing the lowering of flexural modulus.

In addition, the content of the plasticizer in the polylactic acid resin composition is preferably 1% by mass or more, more preferably 3% by mass or more, even more preferably 5% by mass or more, and still even more preferably 6% by mass or more, from the viewpoint of shortening the vibration time as a vibration-damping material, and the content is preferably 30% by mass or less, more preferably 25% by mass or less, even more preferably 20% by mass or less, even more preferably 18% by mass or less, even more preferably 15% by mass or less, and still even more preferably 10% by mass or less, from the viewpoint of suppressing the lowering of flexural modulus.

(Inorganic Material)

The composition of the present invention contains an inorganic material, from the viewpoint of improving flexural modulus. As the inorganic material in the present invention, fibrous inorganic substances, plate-like inorganic substances, granular inorganic substances, and powdery inorganic substances that are ordinarily usable in the reinforcement of thermoplastic resins can be used. These inorganic materials can be used alone or in a combination of two or more kinds. Among them, it is preferable to use fibrous inorganic substances, plate-like inorganic substances, and granular inorganic substances, from the viewpoint of improving flexural modulus.

The fibrous inorganic substances are preferred because the flexural modulus of the resin composition is improved, and at the same time vibration time is shortened. Specific examples include glass fibers, asbestos fibers, carbon fibers, graphite fibers, metal fibers, potassium titanate whiskers, aluminum borate whiskers, magnesium-based whiskers, silicon-based whiskers, wollastonite, sepiolite, asbestos, slag fibers, xonotlite, ellestadite, gypsum fibers, silica fibers, silica alumina fibers, zirconia fibers, boron nitride fibers, silicon nitride fibers, and boron fibers, and the like. Among these fibrous inorganic substances, carbon fibers, glass fibers, and wollastonite are preferred, and glass fibers are more preferred.

In addition, the average aspect ratio (average fiber length/average fiber diameter) of the fibrous inorganic substance is preferably 5 or more, more preferably 10 or more, even more preferably 20 or more, even more preferably 50 or more, and even more preferably 100 or more, from the viewpoint of improving flexural modulus. Although there is no upper limit, the average aspect ratio is preferably 10,000 or less, more preferably 5,000 or less, more preferably 1,000 or less, even more preferably 800 or less, and even more preferably 500 or less, from the viewpoint of improving flexural modulus. The average fiber length of the fibrous inorganic substances can be obtained by observing randomly chosen 100 strands of fibers with an optical microscope, and calculating a number average thereof. The average fiber diameter can be obtained by the same method as described above for a diameter of a cross section of the cut fibers. In a case where the fiber diameter has a length and a breadth, the average fiber diameter is calculated using the length. The average fiber length of the fibrous inorganic substances is preferably 0.01 mm or more, more preferably 0.1 mm or more, and even more preferably 1 mm or more, from the viewpoint of improving flexural modulus. The upper limit thereof is preferably 30 mm or less, more preferably 10 mm or less, and even more preferably 5 mm or less, from the viewpoint of improving flexural modulus. The average fiber diameter of the fibrous inorganic substance is preferably 1 µm or more, more preferably 3 µm or more, and even more preferably 5 µm or more, from the viewpoint of flexural modulus. The upper limit thereof is preferably 30 µm or less, more preferably 25 µm or less, and even more preferably 20 µm or less, from the viewpoint of flexural modulus. In addition, the fiber diameter may be used not only those of circular shapes where a length and a breadth are of equal lengths, but also ellipses having a length different from circular shapes (for example, length/breadth=4), or eyebrow shapes (for example, length/breadth=2) may be used. On the other hand, in order to prepare a resin composition using a kneader such as a twin-screw extruder, when the resin and the fibrous inorganic substance are melt-kneaded, the fibrous inorganic substances are cut by a shearing force in a kneading section, so that an average fiber length would be shortened. The average fiber length of the fibrous inorganic substance in the resin is preferably from 100 to 800 µm, more preferably from 200 to 700 µm, and even more preferably from 300 to 600 µm, from the viewpoint of flexural modulus.

Specific examples of the plate-like or granular inorganic substance include glass flake, non-swellable mica, swellable mica, graphite, metal foil, ceramic beads, talc, clay, mica, sericite, zeolite, bentonite, organic modified bentonite, montmorillonite, organic modified montmorillonite, dolomite, smectite, kaolin, fine silicic acid powder, feldspar powder, potassium titanate, silica balloon, calcium carbonate, magnesium hydroxide, aluminum hydroxide, magnesium carbonate, barium sulfate, calcium oxide, aluminum oxide, silica, magnesium oxide, titanium oxide, aluminum silicate, silicon oxide, gypsum, novaculite, dawsonite, white clay, and the like. Among them, talc, mica, aluminum hydroxide, and calcium carbonate are preferred, and talc and mica are more preferred, from the viewpoint of improving flexural modulus and shortening the vibration time. Mica is even more preferred, from the same viewpoint. Here, the plate-like or granular inorganic substances refer to those substances having an aspect ratio as defined above of less than 5, which are the collective name of the plate-like inorganic substances and the granular inorganic substances.

The above plate-like or granular inorganic substance may be subjected to a coating or binding treatment with a thermoplastic resin such as an ethylene/vinyl acetate copolymer, or with a thermosetting resin such as an epoxy resin, or the inorganic substance may be treated with a coupling agent such as amino silane or epoxy silane.

In addition, the average particle size of the above plate-like or granular inorganic substance is preferably from 0.1 to 20 µm, and more preferably from 0.1 to 10 µm, from the viewpoint of obtaining favorable dispersibility. Here, the average particle size of the plate-like or granular inorganic substance can be obtained by observing randomly chosen 100 inorganic substances with an optical microscope, and calculating a number average thereof. In a case where the diameter has a length and a breadth, the length is used in the calculation.

The content of the inorganic material in the polylactic acid resin composition of the present invention, based on 100 parts by mass of the polylactic acid resin, is preferably 1 part by mass or more, more preferably 5 parts by mass or more, even more preferably 10 parts by mass or more, even more preferably 20 parts by mass or more, and still even more preferably 30 parts by mass or more, from the viewpoint of improving flexural modulus, and the content is preferably 200 parts by mass or less, even more preferably 150 parts by mass or less, even more preferably 120 parts by mass or less, even more preferably 100 parts by mass or less, and still even more preferably 70 parts by mass or less, from the viewpoint of shortening the vibration time as a vibration-damping material. Here, the content of the inorganic material as used herein means a total content in a case where plural inorganic materials are contained.

In addition, the content of the fibrous inorganic substance in the polylactic acid resin composition of the present invention, based on 100 parts by mass of the polylactic acid resin, is preferably 1 part by mass or more, more preferably 3 parts by mass or more, and even more preferably 5 parts by mass or more, and preferably 50 parts by mass or less, more preferably 30 parts by mass or less, and even more preferably 20 parts by mass or less, from the viewpoint of improving flexural modulus of the resin composition, and at the same time shortening the vibration time.

The content of the above plate-like or granular inorganic substance in the polylactic acid resin composition of the present invention, based on 100 parts by mass of the polylactic acid resin, is preferably 1 part by mass or more, more preferably 5 parts by mass or more, even more preferably 10 parts by mass or more, even more preferably 20 parts by mass or more, and still even more preferably 30 parts by mass or more, from the viewpoint of improving flexural modulus, and the content is preferably 200 parts by mass or less, more preferably 150 parts by mass or less, even more preferably 120 parts by mass or less, even more preferably 100 parts by mass or less, and still even more preferably 70 parts by mass or less, from the viewpoint of shortening the vibration time as a vibration-damping material. Here, the content of the plate-like or granular inorganic substance means a total mass of the plate-like inorganic substances and the granular inorganic substances, and the content means a total content in a case where plural compounds are contained.

In addition, in the present invention, it is preferable that the fibrous inorganic substances and one or more members of the plate-like or granular inorganic substances are used in combination, and it is more preferable that glass fibers and talc are used in combination, or glass fibers and mica are used in combination, or glass fibers, talc, and mica are used in combination, from the viewpoint of suppressing the lowering of flexural modulus, and at the same time shortening the vibration time as a vibration-damping material.

In the polylactic acid resin composition of the present invention, a ratio of the mass of the fibrous inorganic substance to the total mass of the plate-like inorganic substance and the granular inorganic substance (fibrous inorganic substance/plate-like or granular inorganic substance), preferably a mass ratio of the glass fibers to talc (glass fibers/talc), a mass ratio of the glass fibers to mica (glass fibers/mica), or a mass ratio of the mass of the glass fibers to a total of talc and mica (glass fibers/(talc+mica)), is preferably 0.1 or more, more preferably 0.15 or more, and preferably 3 or less, more preferably 1 or less, even more preferably 0.5 or less, and still even more preferably 0.35 or less, from the viewpoint of suppressing the lowering of flexural modulus, and at the same time shortening the vibration time as a vibration-damping material.

In the polylactic acid resin composition of the present invention, a mass ratio of the inorganic material to the plasticizer (inorganic material/plasticizer) is preferably 0.1 or more, more preferably 0.5 or more, even more preferably 1 or more, even more preferably 2 or more, and even more preferably 2.5 or more, from the viewpoint of suppressing the lowering of flexural modulus, and the mass ratio is preferably 12 or less, more preferably 10 or less, even more preferably 7 or less, even more preferably 5 or less, and still even more preferably 4 or less, from the viewpoint of shortening the vibration time.

(Organic Crystal Nucleating Agent)

In addition, the polylactic acid resin composition of the present invention contains an organic crystal nucleating agent, from the viewpoint of improving crystallization velocity of the polylactic acid resin, improving crystallinity of the polylactic acid, and improving flexural modulus.

As the organic crystal nucleating agent in the present invention, it is preferable to use one or more organic crystal nucleating agents selected from the group consisting of the following (a) to (d):

(a) one or more organic compounds selected from the group consisting of compounds including an isoindolinone backbone, compounds including a diketo-pyrrolo-pyrrole backbone, compounds including a benzimidazolone backbone, compounds including an indigo backbone, compounds including a phthalocyanine backbone, and compounds including a porphyrin backbone [referred to as organic crystal nucleating agent (a)];

(b) one or more organic compounds selected from the group consisting of carbohydrazides, uracils, and N-substituted ureas [referred to as organic crystal nucleating agent (b)];

(c) one or more organic compounds selected from the group consisting of metal salts of dialkyl aromatic sulfonates, metal salts of phosphoric esters, metal salts of phenylphosphonic acids, metal salts of rosin acids, aromatic carboxylic acid amides, and rosin acid amides [referred to as organic crystal nucleating agent (c)]; and (d) one or more organic compounds selected from the group consisting of compounds containing a hydroxyl group and an amide group in the molecule, and hydroxyfatty acid esters [referred to as organic crystal nucleating agent (d)].

Among them, the organic crystal nucleating agent (c) and the organic crystal nucleating agent (d) are preferred, from the viewpoint of improving flexural modulus.

The organic crystal nucleating agent (c) is preferably metal salts of phenylphosphonic acid containing a phenyl group which may have a substituent and a phosphonic group ($-PO(OH)_2$), from the above viewpoint. The substituent of a phenyl group includes an alkyl group having from 1 to 10 carbon atoms, an alkoxycarbonyl group of which alkoxy group has from 1 to 10 carbon atoms, and the like. Specific examples of the phenylphosphonic acids include unsubstituted phenylphosphonic acid, methylphenylphosphonic acid, ethylphenylphosphonic acid, propylphenylphosphonic acid, butylphenylphosphonic acid, dimethoxycarbonylphenylphosphonic acid, diethoxycarbonylphenylphosphonic acid, and the like, and the unsubstituted phenylphosphonic acid is preferred.

The metal salts of the phenylphosphonic acid include salts of lithium, sodium, magnesium, aluminum, potassium, calcium, barium, copper, zinc, iron, cobalt, nickel, or the like, and the zinc salt is preferred.

The compound having a hydroxyl group and an amide group in the molecule of the organic crystal nucleating agent (d) is preferably an aliphatic amide having a hydroxyl group, and more preferably an aliphatic amide having two or more hydroxyl groups and two or more amide groups in the molecule, from the above viewpoint. Specific examples include hydroxyfatty acid monoamides such as 12-hydroxystearic acid monoethanolamide; hydroxyfatty acid bisamides, such as methylenebis 12-hydroxystearic acid amide, ethylenebis 12-hydroxystearic acid amide, and hexamethylenebis 12-hydroxystearic acid amide; and the like.

In addition, the hydroxyfatty acid esters of the organic crystal nucleating agent (d) are preferably hydroxyfatty acid esters of which fatty acid has from 12 to 22 carbon atoms, and more preferably hydroxyfatty acid esters having two or more hydroxyl groups and two or more ester groups in the molecule. Specific examples include hydroxyfatty acid esters such as 12-hydroxystearic acid triglyceride, 12-hydroxystearic acid diglyceride, 12-hydroxystearic acid monoglyceride, pentaerythritol-mono-12-hydroxystearate, pentaerythritol-di-12-hydroxystearate, and pentaerythritol-tri-12-hydroxystearate.

These may be used alone or in combination of two or more kinds. Among them, from the viewpoint of improving flexural modulus, it is more preferable that (c) and (d) are used in combination, and it is even more preferable that the compound having a hydroxyl group and an amide group in the molecule and the metal salt of phenylphosphonic acid are used in combination, it is even more preferable that a hydroxyfatty acid bisamide and a metal salt of unsubstituted phenylphosphonic acid are used in combination, and it is still even more preferable that ethylenebis 12-hydroxystearamide and zinc salts of unsubstituted phenylphosphonic acid are used in combination.

In addition, a mass ratio of the hydroxyfatty acid bisamide to the metal salt of phenylphosphonic acid (hydroxyfatty acid bisamide/metal salt of phenylphosphonic acid) is preferably 0.2 or more, more preferably 0.3 or more, even more preferably 0.5 or more, and preferably 6 or less, more preferably 4 or less, and even more preferably 2 or less, from the viewpoint of increasing crystallization velocity of the polylactic acid resin, thereby improving flexural modulus.

Here, although the present invention is not intended to exclude further use of other organic crystal nucleating agent besides the organic crystal nucleating agents (a) to (d) (for example, calcium lactate, benzoate, and the like), and an embodiment without using other organic crystal nucleating agent such as calcium lactate or a benzoate is also an embodiment of the present invention.

The content of the organic crystal nucleating agent, based on 100 parts by mass of the polylactic acid resin, is preferably 0.1 parts by mass or more, more preferably 0.5 parts by mass or more, and even more preferably 0.7 parts by mass or more, and preferably 5 parts by mass or less, more preferably 3 parts by mass or less, and even more preferably 2.5 parts by mass or less, from the viewpoint of increasing crystallization velocity of the polylactic acid resin, thereby improving flexural modulus. Here, the content of the organic crystal nucleating agent as used herein means a total content of all the organic crystal nucleating agents contained in the polylactic acid resin composition.

(Hydrolysis Inhibitor)

In addition, the polylactic acid resin composition of the present invention may further properly contain a hydrolysis inhibitor as mentioned above, from the viewpoint of shortening the vibration time as vibration-damping material.

The hydrolysis inhibitor includes carbodiimide compounds such as polycarbodiimide compounds and monocarbodiimide compounds, and the monocarbodiimide compounds are preferred, from the viewpoint of shortening the vibration time as vibration-damping material.

The polycarbodiimide compound includes poly(4,4'-diphenylmethanecarbodiimide), poly(4,4'-dicyclohexylmethanecarbodiimide), poly(1,3,5-triisopropylbenzene)polycarbodiimide, poly(1,3,5-triisopropylbenzene and 1,3-diisopropylbenzene)polycarbodiimide, and the like. The monocarbodiimide compound includes N,N'-di-2,6-diisopropylphenylcarbodiimide, and the like.

The above carbodiimide compounds may be used alone or in a combination of two or more kinds. In addition, as the poly(4,4'-dicyclohexylmethanecarbodiimide), Carbodilite LA-1 manufactured by Nisshinbo Chemical Inc. can be purchased and used; as the poly(1,3,5-triisopropylbenzene) polycarbodiimide and poly(1,3,5-triisopropylbenzene and 1,3-diisopropylbenzene)polycarbodiimide, Stabaxol P and Stabaxol P-100 manufactured by Rhein Chemie Rheinau GmbH can be purchased and used; and as N,N'-di-2,6-diisopropylphenylcarbodiimide, Stabaxol I manufactured by Rhein Chemie Rheinau GmbH can be purchased and used, respectively.

The content of the hydrolysis inhibitor is preferably 0.1 parts by mass or more, more preferably 0.5 parts by mass or more, and even more preferably 1 part by mass or more, and preferably 10 parts by mass or less, more preferably 7 parts by mass or less, and even more preferably 5 parts by mass or less, based on 100 parts by mass of the polylactic acid resin, from the viewpoint of shortening the vibration time as vibration-damping material.

The polylactic acid resin composition of the present invention can contain, as other components besides those mentioned above, an organic filler, a flame retardant, an antioxidant, a lubricant such as a hydrocarbon wax and an anionic surfactant, an ultraviolet absorbent, an antistatic agent, an anti-clouding agent, a photostabilizer, a pigment, a mildewproof agent, a bactericidal agent, a blowing agent, or the like, within the range that would not impair the effects of the present invention. In addition, other polymeric materials and other resin compositions can be contained within the range that would not impair the effects of the present invention.

[Production of Polylactic Acid Resin Composition]

The polylactic acid resin composition of the present invention can be prepared by melt-kneading raw materials containing a polylactic acid resin, a plasticizer, an organic crystal nucleating agent, and an inorganic material, wherein the above plasticizer is blended in an amount of from 1 to 50 parts by mass, based on 100 parts by mass of the polylactic acid resin, and further containing optionally various additives with a known kneader, such as a closed kneader, a single-screw or twin-screw extruder, or an open roller kneader. After melt-kneading, the melt-kneaded product may be dried or cooled in accordance with a known method. The raw materials can also be subjected to melt-kneading after homogeneously mixing the raw materials with a Henschel mixer, a super mixer or the like in advance. Here, a supercritical gas may be allowed to be present while mixing in a molten state in order to accelerate plasticity of the polylactic acid resin when the raw materials are melt-kneaded.

The melt-kneading temperature is preferably 160° C. or higher, more preferably 165° C. or higher, and even more preferably 170° C. or higher, and preferably 250° C. or lower, more preferably 230° C. or lower, and even more preferably 200° C. or lower, from the viewpoint of improving moldability and the prevention of degradation of the polylactic acid resin composition. The melt-kneading time cannot be unconditionally determined because the melt-kneading time depends upon a melt-kneading temperature and the kinds of a kneader, and the melt-kneading time is preferably from 15 to 900 seconds.

The polylactic acid resin composition of the present invention thus obtained can be suitably used as manufactured articles such as audio equipment, electric appliances, construction buildings, and industrial equipment, or parts or housing thereof, for example as a vibration-damping material in a housing for audio equipment, by using various mold-processing methods such as injection molding, extrusion molding or thermoforming as described later. In addition, since the vibration-damping material of the present invention has a high flexural modulus even with a single material, the vibration-damping material has an excellent vibration-damping property of being capable of sufficiently keeping the shape with a single material without having to use a high-rigidity material such as a metal steel plate, so that the vibration-damping material is can be preferably used in manufactured articles that are required to be light-weighted such as automobiles, railroads, and airplanes, or parts or housings thereof. In other words, in the present invention, a polylactic acid resin composition containing a polylactic acid resin, a plasticizer, an organic crystal nucleating agent, and an inorganic material, wherein the plasticizer is contained in an amount of from 1 to 50 parts by mass, based on 100 parts by mass of the polylactic acid resin, can be used as a vibration-damping material.

The vibration-damping material of the present invention can be used, as mentioned above, for speakers, television, radio cassette players, headphones, audio components, microphones, etc. as materials for audio equipment housings; further electromotive tools such as electromotive drills and electromotive drivers, as materials for parts and housings of electric appliances with electromotive motors; electric appliances with cooling fans such as computers, projectors, server, and POS systems, washing machines, clothes dryers, air-conditioned indoor units, sewing machines, dishwashers, fan heaters, multifunctional photocopier machines, printers, scanners, hard disk drives, video cameras, etc.; electromotive toothbrushes, electromotive shavers, massaging machines, etc. as materials for parts and housings of vibrated source-containing electric appliances; generators, gas generators, etc. as materials for parts and housings of electric appliances with motors; refrigerators, automatic vending machines, air-conditioned external machines, dehumidifiers, domestic generators etc. as materials for parts and housings of electric appliances with compressors; materials for interior materials such as dashboards, instrumental panels, floor, doors, roofs, etc., and engine-related materials such as oil pans, front cover, locker cover, etc. as materials for automobile parts; interior materials such as floor, walls, side plates, ceiling, doors, chairs, and tables, housings or parts of motor-related area, various protective covers, etc. as materials for railroad parts; interior materials such as floor, walls, side plates, ceiling, chairs, and tables, housings or parts in the engine-related parts etc. as materials for airplane parts; housings or wall materials for engine room, housings or wall materials for instrumental measurement room, as materials for ship parts; walls, ceiling, floor, partition boards, soundproof walls, shutters, curtain rails, pipe ducts, staircases, doors, etc. as materials for construction; shooters, elevators (lifts), escalators, conveyors, tractors, bulldozers, lawn mowers, etc. as materials for industrial equipment parts.

The application of the vibration-damping material of the present invention to these parts or housings, apparatuses and equipment can be appropriately set according to the methods for producing parts, housings, apparatuses, and equipment, applied parts, and intended purposes, and the vibration-damping material can be used in accordance with a conventional method in the art.

<Parts or Housings Containing Vibration-Damping Material>

The parts or housings containing a vibration-damping material of the present invention can be obtained by injection-molding a polylactic acid resin composition mentioned above. The injection-molded article is not particularly limited, so long as the above polylactic acid resin composition is subjected to injection-molding, and the injection-molded article is obtained, for example, by filling pellets of the above polylactic acid resin composition in an injection-molding machine, and injecting the molten pellets in a mold to mold.

In the injection molding, a known injection-molding machine can be used, including, for example, a machine comprising a cylinder and a screw inserted through an internal thereof as main constituting elements, e.g. J75E-D, J110AD-180H manufactured by The Japan Steel Works, Ltd. or the like. Here, although the raw materials for the above-mentioned polylactic acid resin composition may be supplied to a cylinder and directly melt-kneaded, it is preferable that a product previously melt-kneaded is filled in an injection-molding machine.

The set temperature of the cylinder is preferably from 180° to 220° C., and more preferably from 180° to 210° C. When the melt-kneader is used, the set temperature means the set temperature of the cylinder of the kneader during melt-kneading. Here, the cylinder comprises some heaters, by which temperature control is carried out. The number of heaters depends on the kinds of machines so that the number cannot be unconditionally determined, and it is preferable that the heaters controlled to the above-mentioned set temperature are present at least at the discharge outlet side of the melt-kneaded product, i.e. the side of tip end of nozzle.

The mold temperature is preferably 110° C. or lower, more preferably 100° C. or lower, and even more preferably 90° C. or lower, and preferably 30° C. or higher, more preferably 40° C. or higher, and even more preferably 60° C. or higher, from the viewpoint of improving the crystallization velocity of the polylactic acid resin composition and improving operability. Since the polylactic acid resin composition of the present invention has excellent crystallization velocity and is capable of being mold-processable at low temperatures, a molded article having sufficient heat resistance can be obtained even at a molding temperature defined above.

The holding time inside the mold cannot be unconditionally determined because the holding time differs depending upon the temperature of the mold. The holding time is preferably 3 seconds or more, more preferably 10 seconds or more, and even more preferably 20 seconds or more, from the viewpoint of improving productivity of the molded article, and the holding time is preferably 90 seconds or less, more preferably 80 seconds or less, and even more preferably 70 seconds or less, from the viewpoint of improving operability and from the viewpoint of reducing production costs.

The flexural modulus of the parts or housing containing a vibration-damping material of the present invention thus obtained is, as measured in accordance with the method described in Examples, preferably 2.3 GPa or more, more preferably 2.5 GPa or more, even more preferably 2.8 GPa or more, and still even more preferably 3.0 GPa or more, and the upper limit may be, but not particularly limited to, 15 GPa or less.

The vibration time is, as measured in accordance with the method described in Examples, preferably 1.0 second or less, more preferably 0.8 seconds or less, even more preferably 0.5 seconds or less, and still even more preferably 0.4 seconds or less.

From these, the flexural modulus and the vibration time is preferably 2.3 GPa or more and 1.0 second or less, more preferably 2.5 GPa or more and 1.0 second or less, even more preferably 2.8 GPa or more and 0.8 seconds or less, still even more preferably 3.0 GPa or more and 0.5 seconds or less, and still even more preferably 3.0 GPa or more and 0.4 seconds or less.

In addition, the specific gravity is preferably 1.2 or more, more preferably 1.3 or more, and even more preferably 1.4 or more, from the viewpoint of improving flexural modulus. The upper limit may be, but not particularly limited, to 2.0 or less. Here, the specific gravity as used herein means a ratio with the mass of water at 4° C. of the same volume.

Specific examples will be given hereinbelow in a case where the vibration-damping material of the present invention is used as an audio equipment housing.

<Audio Equipment Housing>

The audio equipment housing of the present invention can be obtained by injection-molding the above polylactic acid resin composition as mentioned above. The injection-molded article is not particularly limited, so long as the above polylactic acid resin composition is subjected to injection-molding, and the injection-molded article is obtained, for example, by filling pellets of the above polylactic acid resin composition in an injection-molding machine, and injecting the molten pellets in a mold to mold.

The injection-molded article of the audio equipment housing of the present invention has a short vibration time even with a high flexural modulus as an audio equipment housing, so that pesante sound quality can be obtained at low noise.

The specific gravity of the audio equipment housing of the present invention is preferably 1.2 or more, more preferably 1.3 or more, and even more preferably 1.4 or more, from the viewpoint of improving flexural modulus. The upper limit may be, but not particularly limited thereto, 2.0 or less. The specific gravity of the audio equipment housing can be increased by, for example, increasing the content of the inorganic material. Here, the specific gravity as used herein means a ratio with the mass of water at 4° C. of the same volume.

It is preferable that the audio equipment housing of the present invention is used, for example, as housings of audio equipment such as speakers, television, radio cassette players, headphones, audio components, or microphones.

The present invention also provides a method for producing parts or housing containing a vibration-damping material of the present invention.

The production method is not particularly limited, so long as the method includes the step of injection-molding a polylactic acid resin composition of the present invention, and the steps can appropriately be added in accordance with the kinds of the molded articles obtained.

Specifically, the method includes an embodiment including the following steps:

step (1): melt-kneading a polylactic acid resin composition containing a polylactic acid resin, a plasticizer, an organic crystal nucleating agent, and an inorganic material, wherein the plasticizer is contained in an amount of from 1 to 50 parts by mass based on 100 parts by mass of the polylactic acid resin, to prepare a melt-kneaded product of the polylactic acid resin composition; and step (2): injection-molding a melt-kneaded product of the polylactic acid resin composition obtained in the step (1) in a mold.

The step (1) is the step to prepare a melt-kneaded product of the polylactic acid resin composition. Specifically, the melt-kneaded product can be prepared by melt-kneading raw materials containing a polylactic acid resin, a plasticizer, an organic crystal nucleating agent, and an inorganic material, wherein the plasticizer is contained in an amount of from 1 to 50 parts by mass based on 100 parts by mass of the polylactic acid resin, at a temperature of preferably from 160° to 250° C., more preferably from 165° to 230° C., and even more preferably from 170° to 200° C.

The step (2) is the step of injection-molding the melt-kneaded product of the polylactic acid resin composition. Specifically, the melt-kneaded product obtained in the step (1) can be molded by filling the melt-kneaded product in an injection-molding machine equipped with a cylinder heated to a temperature of preferably from 180° to 220° C., and more preferably from 180° to 210° C., and injecting in a mold at a temperature of preferably from 30° to 110° C., more preferably from 40° to 100° C., and even more preferably from 60° to 90° C.

The injection-molded article of the present invention thus obtained can be suitably used as parts or housings containing a vibration-damping material, for example, as audio equipment housing.

In addition, with respect to the above-mentioned embodiments, the present invention further discloses the following materials for audio equipment housing, housings, and use thereof.

<1> A material for audio equipment housing, containing a polylactic acid resin composition containing a polylactic acid resin, a plasticizer, an organic crystal nucleating agent, and an inorganic material, wherein the content of the plasticizer is from 1 to 50 parts by mass based on 100 parts by mass of the polylactic acid resin.

<2> The material for audio equipment housing according to the above <1>, wherein the content of the polylactic acid resin is preferably 30% by mass or more, more preferably 40% by mass or more, even more preferably 45% by mass or more, and preferably 90% by mass or less, more preferably 85% by mass or less, and even more preferably 80% by mass or less, of the polylactic acid resin composition.

<3> The material for audio equipment housing according to the above <1> or <2>, wherein the plasticizer preferably contains one or more members selected from the group consisting of polyester-based plasticizers, polyhydric alcohol ester-based plasticizers, polycarboxylic acid ester-based plasticizers, and phosphoric ester-based plasticizers.

<4> The material for audio equipment housing according to the above <3>, wherein the polyhydric alcohol ester-based plasticizer contains a mono-, di- or triester obtained from polyhydric alcohols or (poly)oxyalkylene adducts thereof, and monocarboxylic acids having from 1 to 12 carbon atoms.

<5> The material for audio equipment housing according to any one of the above <1> to <4>, wherein the plasticizer preferably contains an ester compound having a (poly)oxyalkylene group or an alkylene group having from 2 to 6 carbon atoms, more preferably containing one or more members selected from the group consisting of polyester-based plasticizers, polyhydric alcohol ester-based plasticizers, polycarboxylic acid ester-based plasticizers, and phosphoric ester-based plasticizers, each having a (poly)oxyalkylene group or an alkylene group having from 2 to 6 carbon atoms, and even more preferably containing one or more members selected from the group consisting of polyester-based plasticizers, polyhydric alcohol ester-based plasticizers, polycarboxylic acid ester-based plasticizers, and phosphoric ester-based plasticizers, each having a (poly)oxyalkylene group.

<6> The material for audio equipment housing according to any one of the above <1> to <5>, wherein the plasticizer is one or more members selected from the group consisting of:

Compound Group (A): an ester compound containing two or more ester groups in the molecule, wherein at least one kind of the alcohol component constituting the ester compound is an adduct of an alcohol reacted with an alkylene oxide having from 2 to 3 carbon atoms in an amount of from 0.5 to 5 mol on average, per one hydroxyl group;

Compound Group (B): a compound represented by the formula (I):

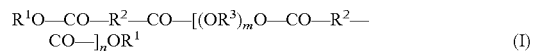

(I)

wherein $R^1$ is an alkyl group having from 1 to 4 carbon atoms; $R^2$ is an alkylene group having from 2 to 4 carbon atoms; $R^3$ is an alkylene group having from 2 to 6 carbon atoms, m is the number of from 1 to 6, and n is the number of from 1 to 12, with proviso that all of $R^2$'s may be identical or different, and that all of $R^3$'s may be identical or different; and Compound Group (C): a compound represented by the formula (II):

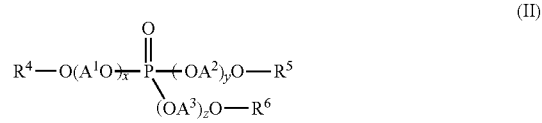

(II)

wherein each of $R^4$, $R^5$, and $R^6$ is independently an alkyl group having from 1 to 4 carbon atoms; each of $A^1$, $A^2$, and $A^3$ is independently an alkylene group having 2 or 3 carbon atoms; and each of x, y, and z is independently a positive number showing the average number of moles of an oxyalkylene group added, wherein x+y+z satisfies a number of exceeding 3 and 12 or less.

<7> The material for audio equipment housing according to any one of the above <3> to <6>, wherein the content of one or more members selected from the group consisting of polyester-based plasticizers, polyhydric alcohol ester-based plasticizers, polycarboxylic acid ester-based plasticizers, and phosphoric ester-based plasticizers, preferably the content of one or more members selected from the group consisting of polyester-based plasticizers, polyhydric alcohol ester-based plasticizers, polycarboxylic acid ester-based plasticizers, and phosphoric ester-based plasticizers, each having a (poly)oxyalkylene group or an alkylene group having from 2 to 6 carbon atoms, more preferably the content of one or more members selected from the group consisting of polyester-based plasticizers, polyhydric alcohol ester-based plasticizers, polycarboxylic acid ester-based plasticizers, and phosphoric ester-based plasticizers, each having a (poly)oxyalkylene group, and even more preferably the content of one or more compounds selected from the group consisting of Compound Groups (A) to (C) mentioned above is preferably 50% by mass or more, more preferably 80% by mass or more, even more preferably 90% by mass or more, and even more preferably substantially 100% by mass, of the plasticizer.

<8> The material for audio equipment housing according to any one of the above <1> to <7>, wherein the content of the plasticizer is preferably 5 parts by mass or more, more preferably 8 parts by mass or more, even more preferably 10 parts by mass or more, and still even more preferably 12 parts by mass or more, and preferably 40 parts by mass or less, more preferably 30 parts by mass or less, even more preferably 25 parts by mass or less, and still even more preferably 20 parts by mass or less, based on 100 parts by mass of the polylactic acid resin.

<9> The material for audio equipment housing according to any one of the above <1> to <8>, wherein the content of the plasticizer is preferably 1% by mass or more, more preferably 3% by mass or more, even more preferably 5% by mass or more, and still even more preferably 6% by mass or more, and preferably 30% by mass or less, more preferably 25% by mass or less, even more preferably 20% by mass or less, even more preferably 18% by mass or less, even more preferably 15% by mass or less, and still even more preferably 10% by mass or less, of the polylactic acid resin composition.

<10> The material for audio equipment housing according to any one of the above <1> to <9>, wherein the inorganic material preferably contains one or more members selected from fibrous inorganic substances, plate-like inorganic substances, granular inorganic substances, and powdery inorganic substances, and more preferably contains one or more members selected from fibrous inorganic substances, plate-like inorganic substances, and granular inorganic substances.

<11> The material for audio equipment housing according to the above <10>, wherein the fibrous inorganic substance is preferably carbon fibers, glass fibers, and wollastonite, and more preferably glass fibers.

<12> The material for audio equipment housing according to the above <10>, wherein the plate-like or granular inorganic substance is preferably talc, mica, aluminum hydroxide, and calcium carbonate, more preferably talc and mica, and even more preferably mica.

<13> The material for audio equipment housing according to any one of the above <1> to <12>, wherein the content of the inorganic material is preferably 1 part by mass or more, more preferably 5 parts by mass or more, even more preferably 10 parts by mass or more, even more preferably 20 parts by mass or more, and still even more preferably 30 parts by mass or more, and preferably 200 parts by mass or less, more preferably 150 parts by mass or less, even more preferably 120 parts by mass or less, even more preferably 100 parts by mass or less, and still even more preferably 70 parts by mass or less, based on 100 parts by mass of the polylactic acid resin.

<14> The material for audio equipment housing according to the above <10>, <11>, or <13>, wherein the content of the fibrous inorganic substance is preferably 1 part by mass or more, more preferably 3 parts by mass or more, and even more preferably 5 parts by mass or more, and preferably 50 parts by mass or less, more preferably 30 parts by mass or less, and even more preferably 20 parts by mass or less, based on 100 parts by mass of the polylactic acid resin.

<15> The material for audio equipment housing according to the above <10>, <12>, or <13>, wherein the content of the plate-like or granular inorganic substance is preferably 1 part by mass or more, more preferably 5 parts by mass or more, even more preferably 10 parts by mass or more, even more preferably 20 parts by mass or more, and still even more preferably 30 parts by mass or more, and preferably 200 parts by mass or less, more preferably 150 parts by mass or less, even more preferably 120 parts by mass or less, even more preferably 100 parts by mass or less, and still even more preferably 70 parts by mass or less, based on 100 parts by mass of the polylactic acid resin.

<16> The material for audio equipment housing according to any one of the above <10> to <15>, wherein it is preferable that the fibrous inorganic substance and one or more members of the plate-like or granular inorganic substances are used in combination, and it is more preferable that glass fibers and talc are used in combination, or glass fibers and mica are used in combination, or glass fibers, talc, and mica are used in combination.

<17> The material for audio equipment housing according to the above <16>, wherein a mass ratio of the mass of the fibrous inorganic substance to a total mass of the plate-like inorganic substance and the granular inorganic substance (fibrous inorganic substance/plate-like and granular inorganic substance), and preferably a mass ratio of glass fibers to talc (glass fibers/talc), a mass ratio of glass fibers to mica (glass fibers/mica), or a ratio of the mass of the glass fibers to a total mass of talc and mica {glass fibers/(talc+mica)} is preferably 0.1 or more, and more preferably 0.15 or more, and preferably 3 or less, more preferably 1 or less, even more preferably 0.5 or less, and still even more preferably 0.35 or less.

<18> The material for audio equipment housing according to any one of the above <1> to <17>, wherein in the polylactic acid resin composition of the present invention, a mass ratio of the inorganic material to the plasticizer (inorganic material/plasticizer) is preferably 0.1 or more, more preferably 0.5 or more, even more preferably 1 or more, even more preferably 2 or more, and even more preferably 2.5 or more, and preferably 12 or less, more preferably 10 or less, even more preferably 7 or less, even more preferably 5 or more, and still even more preferably 4 or less.

<19> The material for audio equipment housing according to any one of the above <1> to <18>, wherein the organic crystal nucleating agent preferably contains one or more organic crystal nucleating agents selected from the group consisting of the following (a) to (d):

(a) one or more organic compounds selected from the group consisting of compounds including an isoindolinone backbone, compounds including a diketo-pyrrolo-pyrrole backbone, compounds including a benzimidazolone backbone, compounds including an indigo backbone, compounds including a phthalocyanine backbone, and compounds including a porphyrin backbone; (b) one or more organic compounds selected from the group consisting of carbohydrazides, uracils, and N-substituted ureas; (c) one or more organic compounds selected from the group consisting of metal salts of dialkyl aromatic sulfonates, metal salts of phosphoric esters, metal salts of phenylphosphonic acids, metal salts of rosin acids, aromatic carboxylic acid amides, and rosin acid amides; and (d) one or more organic compounds selected from the group consisting of compounds containing a hydroxyl group and an amide group in the molecule, and hydroxyfatty acid esters.

<20> The material for audio equipment housing according to the above <19>, wherein the organic crystal nucleating agent (a) is more preferably compounds including a phthalocyanine backbone, and wherein the organic crystal nucleating agent (b) is more preferably carbohydrazides, and wherein the organic crystal nucleating agent (c) is more preferably metal salts of phenylphosphonic acids, metal salts of rosin acids, and aromatic carboxylic acid amides.

<21> The material for audio equipment housing according to any one of the above <1> to <20>, wherein the organic crystal nucleating agent preferably contains one or more organic crystal nucleating agents selected from the group consisting of the following (c) to (d):

(c) one or more organic compounds selected from the group consisting of metal salts of dialkyl aromatic sulfonates, metal salts of phosphoric esters, metal salts of phenylphosphonic acids, metal salts of rosin acids, aromatic carboxylic acid amides, and rosin acid amides [referred to as organic crystal nucleating agent (c)]; and (d) one or more organic compounds selected from the group consisting of compounds containing a hydroxyl group and an amide group in the molecule, and hydroxyfatty acid esters [referred to as organic crystal nucleating agent (d)].

<22> The material for audio equipment housing according to the above <19> or <21>, wherein the organic crystal nucleating agent (c) is preferably metal salts of phenylphosphonic acid containing a phenyl group which may have a substituent and a phosphonic group ($-PO(OH)_2$), and more preferably a zinc salt of the unsubstituted phenylphosphonic acid.

<23> The material for audio equipment housing according to the above <19> or <21>, wherein the compound having a hydroxyl group and an amide group in the molecule of the organic crystal nucleating agent (d) is preferably an aliphatic amide having a hydroxyl group, and more preferably an aliphatic amide having two or more hydroxyl groups and two or more amide groups in the molecule.

<24> The material for audio equipment housing according to any one of the above <1> to <23>, wherein the content of the organic crystal nucleating agent is preferably 0.1 parts by mass or more, more preferably 0.5 parts by mass or more, and even more preferably 0.7 parts by mass or more, and preferably 5 parts by mass or less, more preferably 3 parts by mass or less, and even more preferably 2.5 parts by mass or less, based on 100 parts by mass of the polylactic acid resin.

<25> The material for audio equipment housing according to any one of the above <1> to <24>, wherein the polylactic acid resin composition further contains a hydrolysis inhibitor, preferably carbodiimide compounds such as polycarbodiimide compounds and monocarbodiimide compounds, and more preferably monocarbodiimide compounds.

<26> The material for audio equipment housing according to the above <25>, wherein the content of the hydrolysis inhibitor is preferably 0.1 parts by mass or more, more preferably 0.5 parts by mass or more, and even more preferably 1 part by mass or more, and preferably 10 parts by mass or less, more preferably 7 parts by mass or less, and even more preferably 5 parts by mass or less, based on 100 parts by mass of the polylactic acid resin.

<27> The material for audio equipment housing according to any one of the above <1> to <26>, wherein the material contains a polylactic acid resin composition containing a polylactic acid resin, a plasticizer, an organic crystal nucleating agent, and an inorganic material, wherein the plasticizer is blended in an amount of from 1 to 50 parts by mass based on 100 parts by mass of the polylactic acid resin, and wherein the polylactic acid resin composition is obtained by further melt-kneading raw materials of optionally containing various components.

<28> The material for audio equipment housing according to the above <27>, wherein the melt-kneading temperature is preferably 160° C. or higher, more preferably 165° C. or higher, and even more preferably 170° C. or higher, and preferably 250° C. or lower, more preferably 230° C. or lower, and even more preferably 200° C. or lower.

<29> Use of a polylactic acid resin composition as defined in any one of the above <1> to <28> as a material for audio equipment housing.

<30> An audio equipment housing containing a material for audio equipment housing as defined in any one of the above <1> to <28>.

<31> An audio equipment housing obtained by filling pellets of a polylactic acid resin composition as defined in any one of the <1> to <28> in an injection-molding machine, and injecting the pellets in a mold, to mold.

<32> The audio equipment housing according to the above <30> or <31>, wherein the flexural modulus is preferably 2.3 GPa or more, more preferably 2.5 GPa or more, even more preferably 2.8 GPa or more, and still even more preferably 3.0 GPa or more, and preferably 15 GPa or less.

<33> The audio equipment housing according to any one of the above <30> to <32>, wherein the vibration time is preferably 1.0 second or less, more preferably 0.8 seconds or less, even more preferably 0.5 seconds or less, and still even more preferably 0.4 seconds or less.

<34> The audio equipment housing according to any one of the above <30> to <33>, wherein the flexural modulus and the vibration time are preferably 2.3 GPa or more and 1.0 second or less, more preferably 2.5 GPa or more and 1.0 second or less, even more preferably 2.8 GPa or more and 0.8 seconds or less, still even more preferably 3.0 GPa or more and 0.5 seconds or less, and still even more preferably 3.0 GPa or more and 0.4 seconds or less.

<35> The audio equipment housing according to any one of the above <30> to <34>, which is usable as audio equipment housing of speakers, television, radio cassette players, headphones, audio components, or microphones.

<36> A method for producing an audio equipment housing, including the following steps:

step (1): melt-kneading a polylactic acid resin composition containing a polylactic acid resin, a plasticizer, an organic crystal nucleating agent, and an inorganic material, wherein the plasticizer is contained in an amount of from 1 to 50 parts by mass based on 100 parts by mass of the polylactic acid resin, to prepare a melt-kneaded product of the polylactic acid resin composition; and step (2): injection-molding a melt-kneaded product of the polylactic acid resin composition obtained in the step (1) in a mold.

With respect to the above-mentioned embodiments, the present invention further discloses the following vibration-damping material and use thereof.

<37> A vibration-damping material containing a polylactic acid resin composition containing a polylactic acid resin, a plasticizer, an organic crystal nucleating agent, and an inorganic material, wherein the content of the plasticizer is from 1 to 50 parts by mass based on 100 parts by mass of the polylactic acid resin.

<38> The vibration-damping material according to the above <37>, wherein the content of the polylactic acid resin is preferably 30% by mass or more, more preferably 40% by mass or more, and even more preferably 45% by mass or more, and preferably 90% by mass or less, more preferably 85% by mass or less, and even more preferably 80% by mass or less, of the polylactic acid resin composition.

<39> The vibration-damping material according to the above <37> or <38>, wherein the plasticizer preferably contains one or more members selected from the group consisting of polyester-based plasticizers, polyhydric alcohol ester-based plasticizers, polycarboxylic acid ester-based plasticizers, and phosphoric ester-based plasticizers.

<40> The vibration-damping material according to the above <39>, wherein the polyhydric alcohol ester-based plasticizer contains a mono-, di- or triester obtained from polyhydric alcohols or (poly)oxyalkylene adducts thereof, and monocarboxylic acids having from 1 to 12 carbon atoms.

<41> The vibration-damping material according to any one of the above <37> to <40>, wherein the plasticizer preferably contains an ester compound having a (poly)oxyalkylene group or an alkylene group having from 2 to 6 carbon atoms, more preferably containing one or more members selected from the group consisting of polyester-based plasticizers, polyhydric alcohol ester-based plasticizers, polycarboxylic acid ester-based plasticizers, and phosphoric ester-based plasticizers, each having a (poly)oxyalkylene group or an alkylene group having from 2 to 6 carbon atoms, and even more preferably containing one or more members selected from the group consisting of polyester-based plasticizers, polyhydric alcohol ester-based plasticizers, polycarboxylic acid ester-based plasticizers, and phosphoric ester-based plasticizers, each having a (poly)oxyalkylene group.

<42> The vibration-damping material according to any one of the above <37> to <41>, wherein the plasticizer is one or more members selected from the group consisting of:

Compound Group (A): an ester compound containing two or more ester groups in the molecule, wherein at least one kind of the alcohol component constituting the ester compound is an adduct of an alcohol reacted with an alkylene oxide having from 2 to 3 carbon atoms in an amount of from 0.5 to 5 mol on average, per one hydroxyl group;

Compound Group (B): a compound represented by the formula (I):

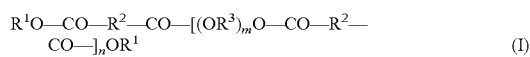

wherein $R^1$ is an alkyl group having from 1 to 4 carbon atoms; $R^2$ is an alkylene group having from 2 to 4 carbon atoms; $R^3$ is an alkylene group having from 2 to 6 carbon atoms, m is the number of from 1 to 6, and n is the number of from 1 to 12, with proviso that all of $R^2$'s may be identical or different, and that all of $R^3$'s may be identical or different; and Compound Group (C): A Compound Represented by the Formula (II):

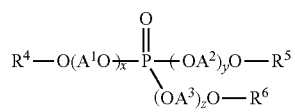

wherein each of $R^4$, $R^5$, and $R^6$ is independently an alkyl group having from 1 to 4 carbon atoms; each of $A^1$, $A^2$, and $A^3$ is independently an alkylene group having 2 or 3 carbon atoms; and each of x, y, and z is independently a positive number showing the average number of moles of an oxyalkylene group added, wherein x+y+z satisfies a number of exceeding 3 and 12 or less.

<43> The vibration-damping material according to any one of the above <39> to <42>, wherein the content of one or more members selected from the group consisting of polyester-based plasticizers, polyhydric alcohol ester-based plasticizers, polycarboxylic acid ester-based plasticizers, and phosphoric ester-based plasticizers, preferably the content of one or more members selected from the group consisting of polyester-based plasticizers, polyhydric alcohol ester-based plasticizers, polycarboxylic acid ester-based plasticizers, and phosphoric ester-based plasticizers, each having a (poly) oxyalkylene group or an alkylene group having from 2 to 6 carbon atoms, more preferably the content of one or more members selected from the group consisting of polyester-based plasticizers, polyhydric alcohol ester-based plasticizers, polycarboxylic acid ester-based plasticizers, and phosphoric ester-based plasticizers, each having a (poly) oxyalkylene group, and even more preferably the content of one or more compounds selected from the group consisting of Compound Groups (A) to (C) mentioned above is preferably 50% by mass or more, more preferably 80% by mass or more, even more preferably 90% by mass or more, and even more preferably substantially 100% by mass, of the plasticizer.

<44> The vibration-damping material according to any one of the above <37> to <43>, wherein the content of the plasticizer is preferably 5 parts by mass or more, more preferably 8 parts by mass or more, even more preferably 10 parts by mass or more, and still even more preferably 12 parts by mass or more, and preferably 40 parts by mass or less, more preferably 30 parts by mass or less, even more preferably 25 parts by mass or less, and still even more preferably 20 parts by mass or less, based on 100 parts by mass of the polylactic acid resin.

<45> The vibration-damping material according to any one of the above <37> to <44>, wherein the content of the plasticizer is preferably 1% by mass or more, more preferably 3% by mass or more, even more preferably 5% by mass or more, and still even more preferably 6% by mass or more, and preferably 30% by mass or less, more preferably 25% by mass or less, even more preferably 20% by mass or less, even more preferably 18% by mass or less, even more preferably 15% by mass or less, and still even more preferably 10% by mass or less, of the polylactic acid resin composition.

<46> The vibration-damping material according to any one of the above <37> to <45>, wherein the inorganic material preferably contains one or more members selected from fibrous inorganic substances, plate-like inorganic substances, granular inorganic substances, and powdery inorganic substances, and more preferably contains one or more members selected from fibrous inorganic substances, plate-like inorganic substances, and granular inorganic substances.

<47> The vibration-damping material according to the above <46>, wherein the fibrous inorganic substance is preferably carbon fibers, glass fibers, and wollastonite, and more preferably glass fibers.

<48> The vibration-damping material according to the above <46>, wherein the plate-like or granular inorganic substance is preferably talc, mica, aluminum hydroxide, and calcium carbonate, more preferably talc and mica, and even more preferably mica.

<49> The vibration-damping material according to any one of the above <37> to <48>, wherein the content of the inorganic material is preferably 1 part by mass or more, more preferably 5 parts by mass or more, even more preferably 10 parts by mass or more, even more preferably 20 parts by mass or more, and still even more preferably 30 parts by mass or more, and preferably 200 parts by mass or less, more preferably 150 parts by mass or less, even more preferably 120 parts by mass or less, even more preferably 100 parts by mass or less, and still even more preferably 70 parts by mass or less, based on 100 parts by mass of the polylactic acid resin.

<50> The vibration-damping material according to the above <46>, <47>, or <49>, wherein the content of the fibrous inorganic substance is preferably 1 part by mass or more, more preferably 3 parts by mass or more, and even more preferably 5 parts by mass or more, and preferably 50 parts by mass or less, more preferably 30 parts by mass or less, and even more preferably 20 parts by mass or less, based on 100 parts by mass of the polylactic acid resin.

<51> The vibration-damping material according to the above <46>, <48>, or <49>, wherein the content of the plate-like or granular inorganic substance is preferably 1 part by mass or more, more preferably 5 parts by mass or more, even more preferably 10 parts by mass or more, even more preferably 20 parts by mass or more, and still even more preferably 30 parts by mass or more, and preferably 200 parts by mass or less, more preferably 150 parts by mass or less, even more preferably 120 parts by mass or less, even more preferably 100 parts by mass or less, and still even more preferably 70 parts by mass or less, based on 100 parts by mass of the polylactic acid resin.

<52> The vibration-damping material according to any one of the above <46> to <51>, wherein it is preferable that the fibrous inorganic substance and one or more members of the plate-like or granular inorganic substances are used in combination, and it is more preferable that glass fibers and talc are used in combination, or glass fibers and mica are used in combination, or glass fibers, talc, and mica are used in combination.

<53> The vibration-damping material according to the above <52>, wherein a ratio of the mass of the fibrous inorganic substance to a total mass of the plate-like inorganic substance and the granular inorganic substance (fibrous inorganic substance/plate-like or granular inorganic substance), preferably a mass ratio of glass fibers to talc (glass fibers/talc), a mass ratio of glass fibers to mica (glass fibers/mica), or a ratio of the mass of the glass fibers to a total mass of talc and mica {glass fibers/(talc+mica)} is preferably 0.1 or more, and more preferably 0.15 or more, and preferably 3 or less, more preferably 1 or less, even more preferably 0.5 or less, and still even more preferably 0.35 or less.

<54> The vibration-damping material according to any one of the above <37> to <53>, wherein in the polylactic acid resin composition of the present invention, a mass ratio of the inorganic material to the plasticizer (inorganic material/plasticizer) is preferably 0.1 or more, more preferably 0.5 or more, even more preferably 1 or more, even more preferably 2 or more, and even more preferably 2.5 or more, and preferably 12 or less, more preferably 10 or less, even more preferably 7 or less, even more preferably 5 or less, and still even more preferably 4 or less.

<55> The material for audio equipment housing according to any one of the above <37> to <54>, wherein the organic crystal nucleating agent preferably contains one or more organic crystal nucleating agents selected from the group consisting of the following (a) to (d):
(a) one or more organic compounds selected from the group consisting of compounds including an isoindolinone backbone, compounds including a diketo-pyrrolo-pyrrole backbone, compounds including a benzimidazolone backbone, compounds including an indigo backbone, compounds including a phthalocyanine backbone, and compounds including a porphyrin backbone; (b) one or more organic compounds selected from the group consisting of carbohydrazides, uracils, and N-substituted ureas; (c) one or more organic compounds selected from the group consisting of metal salts of dialkyl aromatic sulfonates, metal salts of phosphoric esters, metal salts of phenylphosphonic acids, metal salts of rosin acids, aromatic carboxylic acid amides, and rosin acid amides; and (d) one or more organic compounds selected from the group consisting of compounds containing a hydroxyl group and an amide group in the molecule, and hydroxyfatty acid esters.

<56> The material for audio equipment housing according to any one of the above <55>, wherein the organic crystal nucleating agent (a) is more preferably compounds including a phthalocyanine backbone, and wherein the organic crystal nucleating agent (b) is more preferably carbohydrazides, and wherein the organic crystal nucleating agent (c) is more preferably metal salts of phenylphosphonic acids, metal salts of rosin acids, and aromatic carboxylic acid amides.

<57> The vibration-damping material according to any one of the above <37> to <56>, wherein the organic crystal nucleating agent preferably contains one or more organic crystal nucleating agents selected from the group consisting of the following (c) to (d):
(c) one or more organic compounds selected from the group consisting of metal salts of dialkyl aromatic sulfonates, metal salts of phosphoric esters, metal salts of phenylphosphonic acids, metal salts of rosin acids, aromatic carboxylic acid amides, and rosin acid amides [referred to as organic crystal nucleating agent (c)]; and
(d) one or more organic compounds selected from the group consisting of compounds containing a hydroxyl group and an amide group in the molecule, and hydroxyfatty acid esters [referred to as organic crystal nucleating agent (d)].

<58> The vibration-damping material according to the above <55> or <57>, wherein the organic crystal nucleating agent (c) is preferably metal salts of phenylphosphonic acid containing a phenyl group which may have a substituent and a phosphonic group (—PO(OH)$_2$), and more preferably a zinc salt of the unsubstituted phenylphosphonic acid.

<59> The vibration-damping material according to the above <55> or <57>, wherein the compound having a hydroxyl group and an amide group in the molecule of the organic crystal nucleating agent (d) is preferably an aliphatic amide having a hydroxyl group, and more preferably an aliphatic acid amide having two or more hydroxyl groups and two or more amide groups in the molecule.

<60> The vibration-damping material according to any one of the above <37> to <59>, wherein the content of the organic crystal nucleating agent is preferably 0.1 parts by mass or more, more preferably 0.5 parts by mass or more, and even more preferably 0.7 parts by mass or more, and preferably 5 parts by mass or less, more preferably 3 parts by mass or less, and even more preferably 2.5 parts by mass or less, based on 100 parts by mass of the polylactic acid resin.

<61> The vibration-damping material according to any one of the above <37> to <60>, wherein the polylactic acid resin composition further contains a hydrolysis inhibitor, preferably carbodiimide compounds such as polycarbodiimide compounds and monocarbodiimide compounds, and more preferably monocarbodiimide compounds.

<62> The vibration-damping material according to the above <61>, wherein the content of the hydrolysis inhibitor is preferably 0.1 parts by mass or more, more preferably 0.5 parts by mass or more, and even more preferably 1 part by mass or more, and preferably 10 parts by mass or less, more preferably 7 parts by mass or less, and even more preferably 5 parts by mass or less, based on 100 parts by mass of the polylactic acid resin.

<63> The vibration-damping material according to any one of the above <37> to <62>, wherein the vibration-damping material contains a polylactic acid resin composition containing a polylactic acid resin, a plasticizer, an organic crystal nucleating agent, and an inorganic material, wherein the plasticizer is blended in an amount of from 1 to 50 parts by mass based on 100 parts by mass of the polylactic acid resin, and wherein the polylactic acid resin composition is obtained by further melt-kneading with raw materials of optionally containing various components.

<64> The vibration-damping material according to the above <63>, wherein the melt-kneading temperature is preferably 160° C. or higher, more preferably 165° C. or higher, and even more preferably 170° C. or higher, and preferably 250° C. or lower, more preferably 230° C. or lower, and even more preferably 200° C. or lower.

<65> Use of a polylactic acid resin composition as a vibration-damping material as defined in any one of the above <37> to <64>.

<66> A manufactured article or a part thereof selected from the group consisting of audio equipment, electric appliances, transportation vehicles, construction buildings, and industrial equipment, containing a vibration-damping material as defined in any one of the above <37> to <64>.

<67> A manufactured article or a part thereof selected from the group consisting of audio equipment, electric appliances, transportation vehicles, buildings, and industrial equipment, obtained by subjecting pellets of a polylactic acid resin composition as defined in the above <37> to <64> to injection-molding, extrusion-molding, or thermoforming.

<68> Use of a vibration-damping material as defined in the above <37> to <64> as parts of an electromotive motor-attached electric appliances and housing materials.

<69> Use of a vibration-damping material as defined in the above <37> to <64> as parts of vibration source-containing electric appliances and housing materials.

<70> Use of a vibration-damping material as defined in the above <37> to <64> as parts of motor-attached electric appliances and housing materials.

<71> Use of a vibration-damping material as defined in the above <37> to <64> as parts of compressor-attached electric appliances and housing materials.

<72> Use of a vibration-damping material as defined in the above <37> to <64> as materials for automobile parts.

<73> Use of a vibration-damping material as defined in the above <37> to <64> as materials for railroad parts.

<74> Use of a vibration-damping material as defined in the above <37> to <64> as materials for airplane parts.

<75> Use of a vibration-damping material as defined in the above <37> to <64> as materials for ship parts.

<76> Use of a vibration-damping material as defined in the above <37> to <64> as materials for building construction.

<77> Use of a vibration-damping material as defined in the above <37> to <64> as materials for industrial instrumental parts.

<78> Use of a vibration-damping material as defined in the above <37> to <64> in the manufacture of parts of electromotive motor-attached electric appliances and housings thereof.

<79> Use of a vibration-damping material as defined in the above <37> to <64> in the manufacture of parts of vibration source-attached electric appliances and housings thereof.

<80> Use of a vibration-damping material as defined in the above <37> to <64> in the manufacture of parts of motor-attached electric appliances and housings thereof.

<81> Use of a vibration-damping material as defined in the above <37> to <64> in the manufacture of parts of compressor-attached electric appliances and housings thereof.

<82> Use of a vibration-damping material as defined in the above <37> to <64> for the manufacture of automobile parts.

<83> Use of a vibration-damping material as defined in the above <37> to <64> for the manufacture of railroad parts.

<84> Use of a vibration-damping material as defined in the above <37> to <64> for the manufacture of airplane parts.

<85> Use of a vibration-damping material as defined in the above <37> to <64> for the manufacture of ship parts.

<86> Use of a vibration-damping material as defined in the above <37> to <64> for the manufacture of building construction articles.

<87> Use of a vibration-damping material as defined in the above <37> to <64> for the manufacture of industrial instrumental parts.

<88> The manufactured article or a part thereof selected from the group consisting of audio equipment, electric appliances, transportation vehicles, buildings, and industrial equipment as defined in the above <66> or <67>, wherein the flexural modulus is preferably 2.3 GPa or more, more preferably 2.5 GPa or more, even more preferably 2.8 GPa or more, and still even more preferably 3.0 GPa or more, and preferably 15 GPa or less.

<89> The manufactured article or a part thereof selected from the group consisting of audio equipment, electric appliances, transportation vehicles, buildings, and industrial equipment as defined in the above <66>, <67>, or <88>, wherein the vibration time is preferably 1.0 second or less, more preferably 0.8 seconds or less, even more preferably 0.5 seconds or less, and still even more preferably 0.4 seconds or less.

<90> The manufactured article or a part thereof selected from the group consisting of audio equipment, electric appliances, transportation vehicles, buildings, and industrial equipment as defined in the above <66>, <67>, <88>, or <89>, wherein the flexural modulus and the vibration time are preferably 2.3 GPa or more and 1.0 second or less, more preferably 2.5 GPa or more and 1.0 second or less, even more preferably 2.8 GPa or more and 0.8 seconds or less, still even more preferably 3.0 GPa or more and 0.5 seconds or less, and still even more preferably 3.0 GPa or more and 0.4 seconds or less.

EXAMPLES

The present invention will be described more specifically by means of the following Examples. The examples are given solely for the purposes of illustration and are not to be construed as limitations of the present invention. Parts in Examples are parts by mass unless specified otherwise. Here, "ambient pressure" means 101.3 kPa, "ambient temperature" means 25° C.

[Acid Value, Hydroxyl Value, and Saponification Value of Ester Compound of (B)]

Acid Value: The analysis is carried out in accordance with a test method as prescribed in JIS K 0070, except that toluene/ethanol=2/1 (volume ratio) is used as a titration solvent.

Hydroxyl Value: The analysis is carried out in accordance with a test method as prescribed in JIS K 0070, except that acetic anhydride/pyridine=1/4 (volume ratio) is used as an acetylation reagent, and that the amount is changed to 3 mL.
Saponification Value: The analysis is carried out in accordance with a test method as prescribed in JIS K 0070, except that the temperature of the water bath is changed to 95° C., and that the heating temperature is changed to one hour.

[Molecular Weight, Terminal Alkyl Esterification Percentage, and Ether Group Value of Ester Compound of (B)]
Molecular Weight: The molecular weight of the ester compound of (B) as used herein means a number-average molecular weight, which is calculated according to the following formulas from an acid value, a hydroxyl value, and a saponification value:

Average Molecular Weight $M=(M_1+M_2-M_3\times 2)\times n+ M_1-(M_3-17.01)\times 2+(M_3-17.01)\times p+(M_2-17.01)\times q+1.01\times(2-p-q)$ $q$=Hydroxyl Value$\times M\div 56110$ $2-p-q$=Acid Value$\times M\div 56110$ Average Degree of Polymerization $n$=Saponification Value$\times M\div(2\times 56110)-1$ Terminal Alkyl Esterification Percentage: The alkyl esterification percentage at the molecular terminals, i.e. the terminal alkyl esterification percentage, can be calculated by the following formula. The larger the numerical value of the alkyl esterification percentage at the molecular terminals, the smaller the number of free carboxyl groups and free hydroxyl groups, showing that the molecular terminals are sufficiently subjected to alkyl esterification.

Terminal Alkyl Esterification Percentage (%)=$(p\div 2)\times 100$ wherein $M_1$: a molecular weight of a diester obtained from a dicarboxylic acid used as a raw material and a monohydric alcohol used as a raw material;
$M_2$: a molecular weight of a dihydric alcohol used as a raw material;
$M_3$: a molecular weight of a monohydric alcohol used as a raw material;
p: the number of terminal alkyl ester groups in one molecule; and
q: the number of terminal hydroxyl groups in one molecule.
Ether Group Value: The ether group value, which is the number of mmol of the ether groups in one gram of a carboxylic acid ester, is calculated in accordance with the following formula.

Ether Group Value (mmol/g)=$(m-1)\times n\times 1000\div M$ wherein m is an average number of repeats of oxyalkylene groups, i.e. m−1 stands for the number of ether groups in one molecule of the dihydric alcohol.
Incidentally, in a case where plural kinds of dicarboxylic acids, monohydric alcohols or dihydric alcohols are used, a number-average molecular weight is used as the molecular weight.

Production Example 1 of Plasticizer—Diester Obtained from Succinic Acid and Triethylene Glycol Monomethyl Ether A 3-L flask equipped with a stirrer, a thermometer, and a dehydration tube was charged with 500 g of succinic anhydride, 2,463 g of triethylene glycol monomethyl ether, and 9.5 g of paratoluenesulfonic acid monohydrate, and the contents were allowed to react at 110° C. for 15 hours under a reduced pressure of from 4 to 10.7 kPa, while blowing nitrogen at 500 mL/min in a space portion. The liquid reaction mixture had an acid value of 1.6 mgKOH/g. To the liquid reaction mixture was added 27 g of an adsorbent KYOWAAD 500SH manufactured by Kyowa Chemical Industry Co., Ltd., and the mixture was stirred at 80° C. and 2.7 kPa for 45 minutes, and filtered. Thereafter, triethylene glycol monomethyl ether was distilled off at a liquid temperature of from 115° to 200° C. and a pressure of 0.03 kPa, and after cooling to 80° C., the residual liquid was filtered under a reduced pressure, to provide a diester obtained from succinic acid and triethylene glycol monomethyl ether as a filtrate. The diester obtained had an acid value of 0.2 mgKOH/g, a saponification value of 276 mgKOH/g, a hydroxyl value of 1 mgKOH/g or less, and a hue APHA of 200.

Production Example 2 of Plasticizer—Diester Obtained from Succinic Acid and 1,3-Propanediol and Methanol, Raw Materials (Molar Ratio):Dimethyl Succinate/1,3-Propanediol (1.5/1)

A four-necked flask equipped with a stirrer, a thermometer, a dropping funnel, a distillation tube, and a nitrogen blowing tube was charged with 521 g (6.84 mol) of 1,3-propanediol and 5.9 g of a 28% by mass sodium methoxide-containing methanol solution (sodium methoxide: 0.031 mol) as a catalyst, and methanol was distilled off, while stirring at 120° C. and an ambient pressure for 0.5 hours. Thereafter, 1,500 g (10.26 mol) of dimethyl succinate manufactured by Wako Pure Chemical Industries, Ltd. was added dropwise thereto over 1 hour, and the contents were allowed to react at 120° C. and an ambient pressure to distill off methanol formed by the reaction. Next, the temperature was cooled to 60° C., and 5.6 g of a 28% by mass sodium methoxide-containing methanol solution (sodium methoxide: 0.029 mol) was added thereto. The temperature was raised to 120° C. over 2 hours, and the pressure was then gradually dropped from an ambient pressure to 3.7 kPa over 1 hour, to distill off methanol. Thereafter, the temperature was cooled to 80° C., 18 g of KYOWAAD 600S manufactured by Kyowa Chemical Industry Co., Ltd. was added thereto, and the mixture was stirred at 80° C. and a pressure of 4.0 kPa for 1 hour, and then filtered under a reduced pressure. The temperature of the filtrate was raised from 85° to 194° C. at a pressure of 0.1 kPa over 2.5 hours to distill off the residual dimethyl succinate, to provide a yellow liquid at an ambient temperature. Here, the amount of the catalyst used was 0.58 mol per 100 mol of the dicarboxylic acid ester (in the formula (I), $R^1$: methyl, $R^2$: ethylene, $R^3$: 1,3-propylene, m=1, n=4.4; acid value: 0.64 mgKOH/g, hydroxyl value: 1.3 mgKOH/g, saponification value: 719.5 mgKOH/g, number-average molecular weight: 850; terminal alkyl esterification percentage: 98.5%; ether group value: 0 mmol/g).

Production Example 3 of Plasticizer—Tris(ethoxyethoxyethyl) Phosphate

A 1-liter four-neck flask was charged with 600 g (4.47 mol) of diethylene glycol monoethyl ether, and the content was stirred under a reduced pressure of 20 kPa, while blowing a dry nitrogen gas at a flow rate of 50 mL per minute. Next, 114 g (0.745 mol) of phosphorus oxychloride was slowly added dropwise while keeping the internal of the reaction system at room temperature (15° C.), and the mixture was then aged at 40° to 60° C. for 5 hours. Thereafter, 149 g of a 16% by mass aqueous sodium hydroxide solution was added thereto to neutralize, and an excess unreacted diethylene glycol monoethyl ether was distilled off under a reduced pressure, under the temperature conditions of from 70° to 120° C. Further, the residue was contacted with steam, to provide 367 g of a crude phosphoric triester. Further, to this crude phosphoric triester was added 300 g of a 16% by mass aqueous sodium chloride solution to wash the crude phosphoric triester. Thereafter, a lower layer of the separated layers was discarded, and the remaining upper layer was dehydrated at 75° C. under a reduced pressure, and thereafter further filtered to remove a solid content, to provide 266 g of an intended tris(ethoxyethoxyethyl) phosphate (yield: 80%). This tris(ethoxyethoxyethyl) phosphate was a colorless, transparent homogeneous liquid, and was subjected to chlorine ion analysis. As a result, the tris(ethoxyethoxyethyl) phosphate had a chlorine ion content of 10 mg/kg or less.

Examples 1 to 22 and Comparative Examples 1 to 7

Raw materials for polylactic acid resin compositions as listed in Tables 1 to 3 were melt-kneaded at 190° C. with an intermeshing co-rotating twin-screw extruder, manufactured by The Japan Steel Works, Ltd., TEX-28V, and strand-cut, to provide pellets of the polylactic acid resin compositions. Here, the resulting pellets were subjected to dehumidification drying at 110° C. for 3 hours, to adjust its water content to 500 ppm or less.

The pellets obtained were injection-molded with an injection-molding machine manufactured by The Japan Steel Works, Ltd., J110AD-180H, cylinder temperatures set at 6 locations, of which cylinder temperature was set at 200° C. for the sections up to fifth units from the nozzle end side, at 170° C. for the remaining one unit, and at 45° C. for the section below the hopper, to mold into rectangular test pieces
(125 mm×12 mm×6 mm), flat plate test pieces
(100 mm×27 mm×2 mm), and flat plate test pieces
(70 mm×40 mm×2 mm) at a molding temperature as listed in Table 1 or 2, to provide a molded article of the polylactic acid resin composition.

Here, the raw materials in Tables 1 to 3 are as follows.
[Polylactic Acid Resin]
NW4032D: Polylactic acid resin, manufactured by Nature Works LLC under the trade name of Nature Works 4032D, L-form purity: 99%
[ABS Resin]
TOYOLAC 700: ABS resin, manufactured by Toray, Ltd. under the trade name of TOYOLAC 700
[Plasticizer]
(MeEO$_3$)$_2$SA: A diester compound obtained from succinic acid and triethylene glycol monomethyl ether, produced according to the above Production Example 1 of Plasticizer DAIFATTY-101: A mixed diester obtained from adipic acid and a 1/1 diethylene glycol monomethyl ether/benzyl alcohol, manufactured by DAIHACHI CHEMICAL INDUSTRY CO., LTD.
MeSA-1,3PD: A diester obtained from succinic acid and 1,3-propanediol and methanol, produced according to the above Production Example 2 of Plasticizer
TEP-2: Tris(ethoxyethoxyethyl) phosphate, produced according to the above Production Example 3 of Plasticizer
DOA: Bis(2-ethylhexyl) adipate, manufactured by DAIHACHI CHEMICAL INDUSTRY CO., LTD. under the trade name of DOA
[Organic Crystal Nucleating Agent]
Organic Crystal Nucleating Agent (a)
PB 15:3: Copper phthalocyanine, β form, manufactured by Ciba Fine Chemical under the trade name of IRGALI l'E Blue GBP
Organic Crystal Nucleating Agent (b)
T-1287: Decamethylenedicarbonyldibenzoyl hydrazide, manufactured by ADEKA under the trade name of T-1287
Organic Crystal Nucleating Agent (c)
PPA-Zn: A zinc salt of unsubstituted phenylphosphonic acid, manufactured by NISSAN CHEMICAL INDUSTRIES, LTD. under the trade name of ECOPROMOTE
NA-11: A metal salt of a phosphoric ester manufactured by ADEKA under the trade name of ADK STAB NA-11
KM-1500: A metal salt of rosin acid manufactured by ARAKAWA CHEMICAL INDUSTRIES, LTD. under the trade name of PINECRYSTAL KM-1500
TF 1: Trimesylic acid tricyclohexylamide, manufactured by New Japan Chemical Co., Ltd., under the trade name of NJSTAR TF 1 Organic Crystal Nucleating Agent (d)
OHC18EB: Ethylenebis 12-hydroxysteramide, manufactured by Nippon
Kasei Chemical Co., Ltd. under the trade name of SLIPACKS H
[Hydrolysis Inhibitor]
I-LF: Monocarbodiimide, manufactured by Rhein Chemie Rheinau GmbH under the name of Stabaxol I LF
8CA: Polycarbodiimide, manufactured by Nisshinbo Chemical Inc. under the trade name of Carbodilite HMV-8CA
[Inorganic Material]
Talc: One manufactured by Nippon Talc under the trade name of MICROACE P-6
Aluminum Hydroxide: Isocyanate-based silane coupling agent-treated aluminum hydroxide obtained by treating aluminum hydroxide manufactured by TOMOE Engineering Co., Ltd., B-303 with 3-isocyanate propyltriethoxysilane manufactured by Shin-Etsu Chemical Co., Ltd, KBE-9007 at a proportion in a mass ratio of 3-isocyanate propyltriethoxysilane/aluminum hydroxide of 1/99
Calcium carbonate: One manufactured by NITTO FUNKA KOGYO K.K. under the trade name of NCC-A
Glass Fibers: manufactured by T Nippon Electric Glass Co., Ltd. under the trade name of T-187, fiber length: 3 mm, fiber diameter: 12 aspect ratio: 250
Mica: One manufactured by YAMAGUCHI MICA CO., LTD. under the trade name of A21-S The properties of the resin compositions and molded articles obtained were evaluated in accordance with the methods of the following Test Examples 1 to 4. The results are shown in Tables 1 to 3.

Test Example 1—Specific Gravity of Resin Composition

The specific gravity of a resin composition was obtained with a pycnometer in accordance with method B as prescribed in JIS-K7112 (1999). The specific gravity can be used as a measure for flexural modulus, and a specific gravity of 1.2 or more is preferred.

Test Example 2—Flexural Modulus

As to rectangular test pieces having dimension of 125 mm×12 mm×6 mm, as prescribed in JIS K7203, a flexural test was carried out with TENSILON, manufactured by Orientec Co., LTD., TENSILON Tensile Tester RTC-1210A, with setting a crosshead speed to 3 mm/min to obtain a flexural modulus. Those having a flexural modulus of 2.3 GPa or more can be judged to have pesante sound quality.

Test Example 3—Vibration Time

As to flat test pieces having dimension of 100 mm×27 mm×2 mm, a test piece was fixed to a jig as shown in FIG. 1, an end of the test piece was opened after pushing down the end of the test piece to 20 mm below in a horizontal direction, and the time until the vibrations stopped was measured with a high-speed camera manufactured by KEYENCE under the trade name of VW-6000. Those cases where the vibration time is 1.0 second or lower can be judged as sound quality with reduced noise.

Test Example 4—Relative Crystallinity

As to flat test pieces having dimension of 70 mm×40 mm×2 mm, 7.5 mg samples were taken from the central part, and relative crystallinity was obtained as follows. Using a DSC apparatus manufactured by PerkinElmer, Diamond DSC, the 1st RUN included heating from 20° to 200° C. at a heating rate of 20° C./minute, keeping at 200° C. for 5 minutes, cooling from 200° to 20° C. at a cooling rate of −20° C./minute, and keeping at 20° C. for 1 minute, and further, the 2nd RUN included heating from 20° to 200° C. at a heating rate of 20° C./minute. ΔHcc, an absolute value of a cold crystallization enthalpy of a polylactic acid resin observed in 1st RUN, and ΔHm, a melt crystallization enthalpy observed in 2nd RUN, were obtained, and from the found values a relative crystallinity (%) was calculated by the following formula:

Relative Crystallinity (%)={(ΔHm−ΔHcc)/ΔHm×100}

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Raw Materials of Resin Composition (parts by mass) | | | | | | | | | | |
| Polylactic Acid Resin | NW4032D | 100 | 100 | 100 | 100 | 100 | 100 | 100 | 100 | 100 |
| Plasticizer | (MeEO$_3$)$_2$SA | 5 | 15 | 15 | 20 | 30 | 15 | 15 | 15 | 15 |
| | DAIFATTY-101 | — | — | — | — | — | — | — | — | — |
| | MeSA-1,3PD | — | — | — | — | — | — | — | — | — |
| | TEP-2 | — | — | — | — | — | — | — | — | — |
| | DOA | — | — | — | — | — | — | — | — | — |
| Organic Crystal Nucleating Agent | PPA-Zn | 1 | 1 | 1 | 1 | 1 | 1 | 1 | 1 | 1 |
| | OHC18EB | — | — | — | — | — | — | — | — | — |
| Hydrolysis Inhibitor | I-LF | 3 | — | 3 | 3 | 3 | 3 | 3 | 3 | 3 |
| Inorganic Material | Talc | 40 | 40 | 40 | 40 | 40 | 5 | 40 | 100 | 150 |
| | Aluminum Hydroxide | — | — | — | — | — | — | — | — | — |
| | Calcium Carbonate | — | — | — | — | — | — | — | — | — |
| | Mica | — | — | — | — | — | — | — | — | — |
| | Glass Fibers | 10 | 10 | 10 | 10 | 10 | — | — | — | — |
| Mold Temperature for Injection-Molding (° C.) | | 80 | 80 | 80 | 80 | 80 | 80 | 80 | 80 | 80 |
| Properties | | | | | | | | | | |
| Specific Gravity | | 1.49 | 1.44 | 1.44 | 1.41 | 1.37 | 1.25 | 1.40 | 1.58 | 1.95 |
| Flexural Modulus (GPa) | | 3.2 | 3.0 | 3.0 | 2.8 | 2.5 | 2.6 | 2.8 | 5.1 | 6.2 |
| Vibration Time (second) | | 0.77 | 0.37 | 0.35 | 0.22 | 0.20 | 0.34 | 0.37 | 0.63 | 0.85 |
| Relative Crystallinity (%) | | 100 | 100 | 100 | 100 | 100 | 100 | 100 | 100 | 100 |
| Content (% by Mass) in Composition | | | | | | | | | | |
| Polylactic Acid Resin | | 62.9 | 60.2 | 59.2 | 57.5 | 54.3 | 80.6 | 62.9 | 45.7 | 37.2 |
| Plasticizer | | 3.1 | 9.0 | 8.9 | 11.5 | 16.3 | 12.1 | 9.4 | 6.8 | 5.6 |
| Crystal Nucleating Agent | | 0.6 | 0.6 | 0.6 | 0.6 | 0.5 | 0.8 | 0.6 | 0.5 | 0.4 |
| Inorganic Material | | 31.4 | 30.1 | 29.6 | 28.7 | 27.2 | 4.0 | 25.2 | 45.7 | 55.8 |
| Hydrolysis Inhibitor | | 1.9 | 0.0 | 1.8 | 1.7 | 1.6 | 2.4 | 1.9 | 1.4 | 1.1 |
| Mass Ratio of Inorganic Material to Plasticizer (Inorganic Material/Plasticizer) | | 10.0 | 3.3 | 3.3 | 2.5 | 1.7 | 0.3 | 2.7 | 6.7 | 10.0 |

| | | Examples | | | | | | | |
|---|---|---|---|---|---|---|---|---|---|
| | | 10 | 11 | 12 | 13 | 14 | 15 | 16 | 22 |
| Raw Materials of Resin Composition (parts by mass) | | | | | | | | | |
| Polylactic Acid Resin | NW4032D | 100 | 100 | 100 | 100 | 100 | 100 | 100 | 100 |
| Plasticizer | (MeEO$_3$)$_2$SA | 15 | — | — | — | — | 15 | 15 | 15 |
| | DAIFATTY-101 | — | 15 | — | — | — | — | — | — |
| | MeSA-1,3PD | — | — | 15 | — | — | — | — | — |
| | TEP-2 | — | — | — | 15 | — | — | — | — |
| | DOA | — | — | — | — | 15 | — | — | — |
| Organic Crystal Nucleating Agent | PPA-Zn | 1 | 1 | 1 | 1 | 1 | 1 | 1 | 1 |
| | OHC18EB | 1 | — | — | — | — | — | — | — |

TABLE 1-continued

|  |  |  |  |  |  |  |  |  |  |
|---|---|---|---|---|---|---|---|---|---|
| Hydrolysis Inhibitor | I-LF | 3 | 3 | 3 | 3 | 3 | 3 | 3 | 3 |
| Inorganic Material | Talc | 40 | 40 | 40 | 40 | 40 | — | — | — |
|  | Aluminum Hydroxide | — | — | — | — | — | 40 | — | — |
|  | Calcium Carbonate | — | — | — | — | — | — | 40 | — |
|  | Mica | — | — | — | — | — | — | — | 40 |
|  | Glass Fibers | 10 | 10 | 10 | 10 | 10 | 10 | 10 | 10 |
| Mold Temperature for Injection-Molding (° C.) |  | 80 | 80 | 80 | 80 | 80 | 80 | 80 | 80 |
| Properties |  |  |  |  |  |  |  |  |  |
| Specific Gravity |  | 1.44 | 1.44 | 1.44 | 1.44 | 1.44 | 1.42 | 1.45 | 1.45 |
| Flexural Modulus (GPa) |  | 3.2 | 3.2 | 3.4 | 2.9 | 3.4 | 2.5 | 2.6 | 3.5 |
| Vibration Time (second) |  | 0.35 | 0.37 | 0.38 | 0.37 | 0.90 | 0.40 | 0.42 | 0.30 |
| Relative Crystallinity (%) |  | 100 | 100 | 100 | 100 | 100 | 100 | 100 | 100 |
| Content (% by Mass) in Composition |  |  |  |  |  |  |  |  |  |
| Polylactic Acid Resin |  | 58.8 | 59.2 | 59.2 | 59.2 | 59.2 | 59.2 | 59.2 | 59.2 |
| Plasticizer |  | 8.8 | 8.9 | 8.9 | 8.9 | 8.9 | 8.9 | 8.9 | 8.9 |
| Crystal Nucleating Agent |  | 1.2 | 0.6 | 0.6 | 0.6 | 0.6 | 0.6 | 0.6 | 0.6 |
| Inorganic Material |  | 29.4 | 29.6 | 29.6 | 29.6 | 29.6 | 29.6 | 29.6 | 29.6 |
| Hydrolysis Inhibitor |  | 1.8 | 1.8 | 1.8 | 1.8 | 1.8 | 1.8 | 1.8 | 1.8 |
| Mass Ratio of Inorganic Material to Plasticizer (Inorganic Material/Plasticizer) |  | 3.3 | 3.3 | 3.3 | 3.3 | 3.3 | 3.3 | 3.3 | 3.3 |

TABLE 2

|  |  | Examples |  |  |  |  |
|---|---|---|---|---|---|---|
|  |  | 17 | 18 | 19 | 20 | 21 |
| Raw Materials of Resin Composition (parts by mass) |  |  |  |  |  |  |
| Polylactic Acid Resin | NW4032D | 100 | 100 | 100 | 100 | 100 |
| Plasticizer | (MeEO$_3$)$_2$SA | 5 | 5 | 5 | 5 | 5 |
| Organic Crystal Nucleating Agent | PB15:3 | 1 | — | — | — | — |
|  | T-1287 | — | 1 | — | — | — |
|  | NA-11 | — | — | 1 | — | — |
|  | KM-1500 | — | — | — | 1 | — |
|  | TF1 | — | — | — | — | 1 |
| Hydrolysis Inhibitor | I-LF | 3 | 3 | 3 | 3 | 3 |
| Inorganic Material | Talc | 40 | 40 | 40 | 40 | 40 |
|  | Glass Fibers | 10 | 10 | 10 | 10 | 10 |
| Mold Temperature for Injection-Molding (° C.) |  | 80 | 80 | 80 | 80 | 80 |
| Properties |  |  |  |  |  |  |
| Specific Gravity |  | 1.49 | 1.49 | 1.49 | 1.49 | 1.49 |
| Flexural Modulus (GPa) |  | 3.1 | 3.1 | 3.1 | 3.1 | 3.1 |
| Vibration Time (second) |  | 0.78 | 0.79 | 0.80 | 0.80 | 0.79 |
| Relative Crystallinity (%) |  | 100 | 100 | 100 | 100 | 100 |
| Content (% by Mass) in Composition |  |  |  |  |  |  |
| Polylactic Acid Resin |  | 62.9 | 62.9 | 62.9 | 62.9 | 62.9 |
| Plasticizer |  | 3.1 | 3.1 | 3.1 | 3.1 | 3.1 |
| Crystal Nucleating Agent |  | 0.6 | 0.6 | 0.6 | 0.6 | 0.6 |
| Inorganic Material |  | 31.4 | 31.4 | 31.4 | 31.4 | 31.4 |
| Hydrolysis Inhibitor |  | 1.9 | 1.9 | 1.9 | 1.9 | 1.9 |
| Mass Ratio of Inorganic Material to Plasticizer (Inorganic Material/Plasticizer) |  | 10.0 | 10.0 | 10.0 | 10.0 | 10.0 |

TABLE 3

|  |  | Comparative Examples |  |  |  |  |  |  |
|---|---|---|---|---|---|---|---|---|
|  |  | 1 | 2 | 3 | 4 | 5 | 6 | 7 |
| Raw Materials of Resin Composition (parts by mass) |  |  |  |  |  |  |  |  |
| Polylactic Acid Resin | NW4032D | — | 100 | 100 | 100 | 100 | 100 | — |
| ABS Resin | TOYOLAC 700 | 100 | — | — | — | — | — | 100 |
| Plasticizer | (MeEO$_3$)$_2$SA | 15 | — | 15 | — | 60 | 5 | — |
| Organic Crystal Nucleating Agent | PPA-Zn | — | 1 | 1 | — | 1 | — | — |
| Hydrolysis Inhibitor | I-LF | — | 3 | 3 | — | 3 | 3 | — |
|  | 8CA | — | — | — | 3 | — | — | — |

TABLE 3-continued

|  |  | Comparative Examples | | | | | | |
|---|---|---|---|---|---|---|---|---|
|  |  | 1 | 2 | 3 | 4 | 5 | 6 | 7 |
| Inorganic Material | Talc | 40 | 40 | — | — | 40 | 40 | — |
|  | Aluminum Hydroxide | — | — | — | 85 | — | — | — |
|  | Glass Fibers | 10 | 10 | — | — | 10 | — | — |
| Mold Temperature for Injection-Molding (° C.) | | 40 | 80 | 80 | 110 | 80 | 80 | 40 |
| Properties | | | | | | | | |
| Specific Gravity | | 1.26 | 1.46 | 1.23 | 1.64 | 1.34 | 1.49 | 1.05 |
| Flexural Modulus (GPa) | | 3.0 | 9.0 | 1.6 | 10 | 2.1 | 2.8 | 2.3 |
| Vibration Time (second) | | 2.88 | 1.20 | 0.48 | 1.80 | 0.18 | 0.92 | 2.89 |
| Relative Crystallinity (%) | | — | 100 | 100 | 100 | 100 | 100 | — |
| Content (% by Mass) in Composition | | | | | | | | |
| Polylactic Acid Resin | | 0.0 | 64.9 | 84.0 | 53.2 | 46.7 | 67.6 | 0.0 |
| Plasticizer | | 9.1 | 0.0 | 12.6 | 0.0 | 28.0 | 3.4 | 0.0 |
| Crystal Nucleating Agent | | 0.0 | 0.6 | 0.8 | 0.0 | 0.5 | 0.0 | 0.0 |
| Inorganic Material | | 30.3 | 32.5 | 0.0 | 45.2 | 23.4 | 27.0 | 0.0 |
| Hydrolysis Inhibitor | | 0.0 | 1.9 | 2.5 | 1.6 | 1.4 | 2.0 | 0.0 |
| Mass Ratio of Inorganic Material to Plasticizer (Inorganic Material/Plasticizer) | | 3.3 | 0.0 | — | 0.0 | 0.8 | 8.0 | — |

As a result, it can be seen from Examples 1 to 5 that the vibration time is shortened by increasing an amount of the plasticizer. Especially, when the plasticizer is contained in an amount up to 15 parts by mass or so based on 100 parts by mass of the polylactic acid resin, the lowering of the flexural modulus is lessened, so that the vibration time is shorter, and the flexural modulus is also excellent. In addition, it can be seen from the comparison of Example 3 with Example 10 that flexural modulus can be improved by improving the crystallization velocity of the polylactic acid resin. It can be seen from the comparison of Example 3 with Example 7 that the glass fibers can improve flexural modulus, and at the same time also shorten the vibration time. It can be seen from Examples 3, 15, 16, and 22 that talc and mica give shorter vibration time than aluminum hydroxide or calcium carbonate even while having high flexural moduli. It can be seen from Example 3 and Examples 11 to 14 that in a case where a specified plasticizer is contained, the vibration time is remarkably shortened.

On the other hand, from Comparative Example 1, even when ABS resin is used in place of the polylactic acid resin, the vibration time would not be shortened. It can be seen from Comparative Example 5 that in a case where the plasticizer is used in an amount of 60 parts by mass based on 100 parts by mass of the polylactic acid resin, the flexural modulus is lowered. In addition, it can been from the comparison of Example 1 with Comparative Example 6 that the addition of the organic crystal nucleating agent controls the number of crystals and sizes thereof due to the effects of improving crystallization velocity of the polylactic acid resin and promoting growth of crystal nuclei of the polylactic acid resin, whereby flexural modulus can be improved, and at the same time the vibration time can be shortened.

Use embodiments will be given hereinbelow, without intending to limit the scope of the present invention to these embodiments. Here, the amount of each component used (unit) is expressed by "parts by mass," unless specified otherwise.

Use Embodiment 1—Audio Equipment

A resin composition of Example 11 is injection-molded using a housing mold comprising a dent portion in the shape of a speaker, and front and back cabinets, under conditions of a cylinder temperature of 200° C., a mold temperature of 80° C., and a mold retention time of 30 seconds, to produce a speaker device. Because of the excellent vibration-damping property of the present invention, the undesired sounds or noises from the vibrations of the speakers can be markedly reduced, so that sound quality can be improved.

Use Embodiment 2—Audio Equipment

A resin composition of Example 10 is injection-molded to a headphone housing and driver frame of the vibration member under the molding conditions of a cylinder temperature of 200° C., a mold temperature of 80° C., and a mold retention time of 30 seconds to produce headphones. Because of the excellent vibration-damping property of the present invention, the undesired sounds or noises from the vibrations can be markedly reduced, so that sound quality can be improved.

Use Embodiment 3—Electric Appliance

A resin composition of Example 12 is injection-molded to a housing for electromotive toothbrush under the molding conditions of a cylinder temperature of 200° C., a mold temperature of 80° C., and a mold retention time of 30 seconds to produce an electromotive toothbrush. Because of the excellent vibration-damping property of the present invention, the uncomfortable vibrations generated at the handle part of the electromotive toothbrush can be markedly reduced.

Use Embodiment 4—Electric Appliance

A resin composition of Example 11 is injection-molded to a housing for electromotive shaver under the molding conditions of a cylinder temperature of 210° C., a mold temperature of 80° C., and a mold retention time of 30 seconds to produce an electromotive shaver. Because of the excellent vibration-damping property of the present invention, the uncomfortable vibrations generated at the handle part of the electromotive shaver can be markedly reduced, and the vibration sound can be reduced.

Use Embodiment 5—Electric Appliance

A composition of Example 4 is injection-molded to a cover for compressor under the molding conditions of a cylinder temperature of 210° C., a mold temperature of 80° C., and a mold retention time of 30 seconds to produce a refrigerator. Because of the excellent vibration-damping property of the present invention, the vibrations and undesired sounds generated from the compressor can be markedly reduced.

Use Embodiment 6—Transportation Vehicle

A resin composition of Example 11 is injection-molded under the conditions of a cylinder temperature of 210° C., a mold temperature of 80° C., and a mold retention time of 30 seconds to produce a dashboard and an instrumental panel, to be mounted on an automobile. Because of the excellent vibration-damping property of the present invention, the vibrations and noises generated from the engine, road noises, and wind draft sounds can be markedly reduced, whereby the comfortableness of the driver can be improved.

Use Embodiment 7—Construction Building

A resin composition of Example 10 is extrusion-molded under the conditions of a cylinder temperature of 200° C., and a die temperature of 80° C., to form a plate having a thickness of 10 mm, to produce a board for housings, and the wall sides and the ceiling side of a room are bonded together. Because of the excellent vibration-damping property of the present invention, the noises and vibrations from outdoor area or neighboring rooms can be markedly reduced, so that the comfortableness can be improved.

Use Embodiment 8—Industrial Equipment

A resin composition of Example 11 is extrusion-molded under the conditions of a cylinder temperature of 200° C., and a die temperature of 80° C., to form a plate having a thickness of 5 mm, to produce a board for interior decoration, and the wall sides and the ceiling side of an elevator or lift are bonded together. Because of the excellent vibration-damping property of the present invention, the noises and vibrations upon operation can be markedly reduced, so that the comfortableness can be improved.

INDUSTRIAL APPLICABILITY

The vibration-damping material of the present invention can be suitably used as materials for audio equipment of, for example, speakers, television, radio cassette players, headphones, audio components, or microphones, and manufactured articles, such as electric appliances, transportation vehicles, construction buildings, and industrial equipment, or parts or housing thereof.

The invention claimed is:

1. A method for vibration-damping comprising using a polylactic acid resin composition comprising a polylactic acid resin, a plasticizer, an organic crystal nucleating agent, and an inorganic material, wherein the content of the plasticizer is from 1 to 50 parts by mass based on 100 parts by mass of the polylactic acid resin, in a manufactured article or a part or housing thereof selected from the group consisting of audio equipment, electric appliances, transportation vehicles, construction buildings, and industrial equipment.

2. The method according to claim 1, wherein the plasticizer comprises one or more members selected from the group consisting of polyester-based plasticizers, polyhydric alcohol ester-based plasticizers, polycarboxylic acid ester-based plasticizers, and phosphoric ester-based plasticizers.

3. The method according to claim 2, wherein the polyhydric alcohol ester-based plasticizer comprises a mono-, di- or triester obtained from polyhydric alcohols or (poly)oxyalkylene adducts thereof, and monocarboxylic acids having from 1 to 12 carbon atoms.

4. The method according to claim 1, wherein a mass ratio of the inorganic material to the plasticizer (inorganic material/plasticizer) is from 0.1 to 12.

5. The method according to claim 1, wherein the content of the inorganic material is from 1 to 200 parts by mass, based on 100 parts by mass of the polylactic acid resin.

6. The method according to claim 1, wherein the inorganic material comprises the fibrous inorganic substance and one or more members of the plate-like or granular inorganic substances used in combination.

7. The method according to claim 6, wherein the fibrous inorganic substance is one or more members selected from the group consisting of carbon fibers, glass fibers, and wollastonite.

8. The method according to claim 6, wherein the plate-like or granular inorganic substance is one or more members selected from the group consisting of talc, mica, aluminum hydroxide, and calcium carbonate.

9. The method according to claim 1, wherein the content of the inorganic material is 20 parts by mass or more and 120 parts by mass or less, based on 100 parts by mass of the polylactic acid resin.

10. The method according to claim 1, wherein the plasticizer comprises one or more members selected from the group consisting of:

(A): an ester compound having two or more ester groups in the molecule, wherein at least one kind of the alcohol component constituting the ester compound is an adduct of an alcohol reacted with an alkylene oxide having from 2 to 3 carbon atoms in an amount of from 0.5 to 5 mol on average, per one hydroxyl group;

(B): a compound represented by the formula (I):

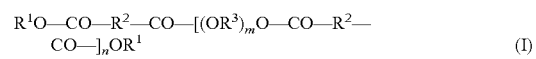

wherein $R^1$ is an alkyl group having from 1 to 4 carbon atoms; $R^2$ is an alkylene group having from 2 to 4 carbon atoms; $R^3$ is an alkylene group having from 2 to 6 carbon atoms, m is the number of from 1 to 6, and n is the number of from 1 to 12, with proviso that all of $R^2$'s may be identical or different, and that all of $R^3$'s may be identical or different; and (C): a compound represented by the formula (II):

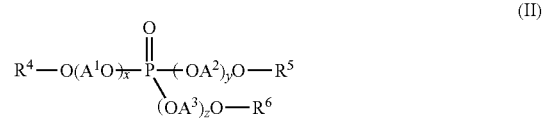

wherein each of $R^4$, $R^5$, and $R^6$ is independently an alkyl group having from 1 to 4 carbon atoms; each of $A^1$, $A^2$, and $A^3$ is independently an alkylene group having 2 or 3 carbon atoms; and each of x, y, and z is independently a positive number showing the average number of moles of an oxyalkylene group added, wherein x+y+z satisfies a number of exceeding 3 and 12 or less.

11. The method according to claim 1, wherein the content of the plasticizer is 5 parts by mass or more and 30 parts by mass or less, based on 100 parts by mass of the polylactic acid resin.

12. The method according to claim 1, wherein the organic crystal nucleating agent comprises one or more organic crystal nucleating agents selected from the group consisting of the following (a) to (d):
   (a) one or more organic compounds selected from the group consisting of compounds comprising an isoindolinone backbone, compounds comprising a diketo-pyrrolo-pyrrole backbone, compounds comprising a benzimidazolone backbone, compounds comprising an indigo backbone, compounds comprising a phthalocyanine backbone, and compounds comprising a porphyrin backbone;
   (b) one or more organic compounds selected from the group consisting of carbohydrazides, uracils, and N-substituted ureas;
   (c) one or more organic compounds selected from the group consisting of metal salts of dialkyl aromatic sulfonates, metal salts of phosphoric esters, metal salts of phenylphosphonic acids, metal salts of rosin acids, aromatic carboxylic acid amides, and rosin acid amides; and
   (d) one or more organic compounds selected from the group consisting of compounds comprising a hydroxyl group and an amide group in the molecule, and hydroxyfatty acid esters.

13. The method according to claim 1, wherein the organic crystal nucleating agent comprises one or more organic crystal nucleating agents selected from the group consisting of the following (c) and (d):
   (c) one or more organic compounds selected from the group consisting of metal salts of dialkyl aromatic sulfonates, metal salts of phosphoric esters, metal salts of phenylphosphonic acids, metal salts of rosin acids, aromatic carboxylic acid amides, and rosin acid amides; and
   (d) one or more organic compounds selected from the group consisting of compounds having a hydroxyl group and an amide group in the molecule, and hydroxyfatty acid esters.

14. The method according to claim 1, wherein the organic crystal nucleating agent comprises metal salts of phenylphosphonic acid having a phenyl group which may have a substituent and a phosphonic group ($-PO(OH)_2$).

15. The method according to claim 1, wherein the organic crystal nucleating agent comprises an aliphatic amide having two or more hydroxyl groups and two or more amide groups in the molecule.

16. The method according to claim 1, wherein the flexural modulus is 2.3 GPa or more, and the vibration time is 1.0 second or less.

* * * * *